(12) United States Patent
Vaccari et al.

(10) Patent No.: US 10,812,438 B1
(45) Date of Patent: *Oct. 20, 2020

(54) INTEGRATED TELEPHONE APPLICATIONS ON ONLINE SOCIAL NETWORKS

(71) Applicant: Facebook, Inc., Menlo Park, CA (US)

(72) Inventors: Andrea Vaccari, San Francisco, CA (US); Li Hua, Bellevue, WA (US); Jia Li, Redmond, WA (US); Yimin Chen, Redmond, WA (US); Zheng Fang, Bellevue, WA (US); David James Mason, Sequim, WA (US); Shu Wu, Seattle, WA (US); Xiaotian Guo, Kirkland, WA (US); Xiaowei Jiang, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 15/976,740

(22) Filed: May 10, 2018

Related U.S. Application Data

(63) Continuation of application No. 14/721,762, filed on May 26, 2015, now Pat. No. 10,003,563.

(51) Int. Cl.
*H04L 12/58* (2006.01)
*H04L 29/08* (2006.01)
*H04L 12/26* (2006.01)

(52) U.S. Cl.
CPC ............ *H04L 51/32* (2013.01); *H04L 43/045* (2013.01); *H04L 51/38* (2013.01); *H04L 67/306* (2013.01)

(58) Field of Classification Search
CPC ........ H04L 51/32; H04L 51/38; H04L 61/306
See application file for complete search history.

(56) References Cited

U.S. PATENT DOCUMENTS 6,798,876 B1 * 9/2004 Bala .................... H04M 3/5233
    379/265.12
7,043,690 B1 * 5/2006 Bates .................... G06F 17/273
    715/234

(Continued)

FOREIGN PATENT DOCUMENTS

EP    1367522    12/2003
EP    1591939    11/2005

(Continued)

OTHER PUBLICATIONS

Gabbatt et al., Facebook mail: it might kill GMail, but "it's not email", http://www.quardian.co.uk/technology/2010/nov/15/facebook-mail-umail-killer-email, pp. 1-5, Nov. 15, 2010.

(Continued)

*Primary Examiner* — Michael A Keller
*Assistant Examiner* — Jsing Forng Lin
(74) *Attorney, Agent, or Firm* — Baker Botts L.L.P.

(57) ABSTRACT

In one embodiment, a method includes receiving a unique identifier of a second user from a mobile client system of a first user after the second user requests to communicate with the first user, identifying the second user based on the unique identifier, retrieving multiple items of profile information of the second user, determining whether the unique identifier is in a list of blocked identifiers, and sending to the first user a notification that a communication request form the second user has been declined if the unique identifier is in the list of blocked identifiers. The method also includes sending the first user multiple items of profile information of the second user if the unique identifier is in the list of blocked identifiers.

20 Claims, 16 Drawing Sheets

(56) References Cited

U.S. PATENT DOCUMENTS

| | | | |
|---|---|---|---|
| 7,469,292 B2* | 12/2008 | Landsman | G06Q 10/107 709/207 |
| 8,155,678 B2* | 4/2012 | Lira | H04L 51/38 455/466 |
| 2003/0166409 A1 | 9/2003 | Ishii | |
| 2004/0039786 A1 | 2/2004 | Horvitz | |
| 2004/0148275 A1 | 7/2004 | Achlioptas | |
| 2004/0181586 A1 | 9/2004 | Morreale | |
| 2004/0210661 A1 | 10/2004 | Thompson | |
| 2004/0215726 A1 | 10/2004 | Arning | |
| 2004/0235520 A1 | 11/2004 | Cadiz | |
| 2004/0243611 A1 | 12/2004 | Alexander | |
| 2005/0097188 A1 | 5/2005 | Fish | |
| 2005/0198171 A1 | 9/2005 | Landsman | |
| 2005/0204001 A1 | 9/2005 | Stein | |
| 2005/0210125 A1 | 9/2005 | Li | |
| 2005/0234877 A1 | 10/2005 | Yu | |
| 2005/0234972 A1 | 10/2005 | Zeng | |
| 2006/0026244 A1 | 2/2006 | Watson | |
| 2006/0069663 A1 | 3/2006 | Adar | |
| 2006/0265670 A1 | 11/2006 | Cohen | |
| 2006/0288075 A1 | 12/2006 | Wu | |
| 2007/0011234 A1* | 1/2007 | Albrecht | G06Q 10/00 709/204 |
| 2007/0050455 A1 | 3/2007 | Yach | |
| 2007/0106741 A1 | 5/2007 | Christoff | |
| 2007/0203790 A1 | 8/2007 | Torrens | |
| 2007/0208729 A1 | 9/2007 | Martino | |
| 2007/0214133 A1 | 9/2007 | Liberty | |
| 2007/0255807 A1 | 11/2007 | Hayashi | |
| 2007/0266095 A1 | 11/2007 | Billsus | |
| 2007/0294428 A1 | 12/2007 | Guy | |
| 2008/0005125 A1 | 1/2008 | Gaedeke | |
| 2008/0071774 A1 | 3/2008 | Gross | |
| 2008/0140650 A1 | 6/2008 | Stackpole | |
| 2008/0152097 A1 | 6/2008 | Kent | |
| 2009/0041217 A1 | 2/2009 | Balk | |
| 2009/0157513 A1 | 6/2009 | Bonev | |
| 2009/0210898 A1* | 8/2009 | Childress | H04H 60/46 725/34 |
| 2009/0221307 A1 | 9/2009 | Wolak | |
| 2009/0248844 A1 | 10/2009 | Sommer | |
| 2009/0268716 A1 | 10/2009 | Lamb | |
| 2010/0027778 A1 | 2/2010 | Kumar | |
| 2010/0063891 A1 | 3/2010 | Townsend | |
| 2010/0082695 A1 | 4/2010 | Hardt | |
| 2010/0082732 A1 | 4/2010 | Guenther | |
| 2010/0091968 A1 | 4/2010 | Reid | |
| 2010/0098226 A1 | 4/2010 | Gupta | |
| 2010/0125897 A1 | 5/2010 | Jain | |
| 2010/0166159 A1 | 7/2010 | Katis | |
| 2010/0208876 A1 | 8/2010 | Tsuei | |
| 2010/0262576 A1 | 10/2010 | Stockwell | |
| 2010/0304729 A1 | 12/2010 | Sabotta | |
| 2010/0312644 A1 | 12/2010 | Borgs | |
| 2011/0021250 A1 | 1/2011 | Ickman | |
| 2011/0137918 A1 | 6/2011 | Yasrebi | |
| 2011/0207440 A1* | 8/2011 | Ruuspakka | H04W 4/08 455/414.1 |
| 2011/0213800 A1 | 9/2011 | Saros | |
| 2011/0244840 A1 | 10/2011 | Tang | |
| 2011/0250874 A1 | 10/2011 | Shah | |
| 2011/0274260 A1 | 11/2011 | Vaananen | |
| 2011/0294478 A1* | 12/2011 | Trivi | H04M 3/436 455/415 |
| 2011/0302509 A1 | 12/2011 | Leacock | |
| 2012/0022950 A1 | 1/2012 | Gilbert | |
| 2012/0150772 A1 | 6/2012 | Paek | |
| 2012/0150955 A1 | 6/2012 | Tseng | |
| 2012/0196581 A1* | 8/2012 | Papakipos | H04L 51/046 455/415 |
| 2012/0215733 A1 | 8/2012 | Breiter | |
| 2012/0226704 A1 | 9/2012 | Boland | |
| 2012/0250845 A1 | 10/2012 | Hiller | |
| 2013/0051542 A1 | 2/2013 | Yao | |
| 2013/0054749 A1* | 2/2013 | Yao | H04M 1/575 709/219 |
| 2013/0055099 A1 | 2/2013 | Yao | |
| 2013/0132519 A1 | 5/2013 | Walsh | |
| 2014/0025702 A1 | 1/2014 | Curtiss | |
| 2014/0032659 A1 | 1/2014 | Marini | |
| 2014/0122628 A1 | 5/2014 | Yao | |
| 2015/0026120 A1 | 1/2015 | Chrapko | |
| 2015/0235289 A1* | 8/2015 | Jeremias | G06F 16/951 705/26.41 |

FOREIGN PATENT DOCUMENTS

| | | |
|---|---|---|
| JP | 2000/301073 | 10/2000 |
| KR | 10-2006-0012736 | 2/2006 |
| WO | 2005/074444 | 8/2005 |
| WO | 2007/075622 | 9/2007 |
| WO | 2012/106345 | 9/2012 |
| WO | 2013/028325 | 2/2013 |

OTHER PUBLICATIONS

"What's new in mobile operator services? Try Caller ID", Kevin Fitchard, URL: http://blog.connectedplanetonline.com/unfiltered/2011/07/13/whats-new-in-mobile-operator-services-try-caller-id, Jul. 13, 2011.

Johnson, WJ; "Method for Ambiguous Address Resolution of Potential Recipients," IBM Technical Disclosure Bulletin, IBM Corp., New York, US., vol. 35(7), pp. 199-200, Dec. 1, 1992.

Outlook Auto BCC, http://ww.filebot.org/Internat/E-Mail/item8615-5.html, 3 pgs.

Outlook Auto BCC, http://www.office-addins.com/-outlook-addins/outlook-auto-bcc.html, 4 pgs.

Foley, John, "Aggregate Knowledge Aims to Be A Mind Reader on The Web," http://www.informationweek.com/blog/main/archives/2007/08/aggregate_knowl.html, 2 pgs, Aug. 27, 2007.

Dredze, Mark et al., "Sorry, I forgot the Attachment: Email Attachment Prediction," CEAS 2006 Third Conference on Email and AntiSpam, 3 pgs, Jul. 27-28, 2006.

Dredze, Mark, et al., "Automatically Classifying Emails into Activities," IUI'06, Jan. 29-Feb. 1, 2006, Sydney, Australia, 8 pgs, 2006.

Carvalho, Vitor, "CC Prediction in the Enron Corpus," Carnegie Mellon University, Fall 2006, 10 pgs, 2006.

McCallum, Andrew et al., "The Author-Recipient-Topic Model for Topic and Role Discovery in Social Networks: Experiments with Enron and Academic Email," Technical Report UM-CS-2004-096, University of Massachusetts Amherst, 16 pgs, Dec. 11, 2004.

Revenue Science Press Release, 1 pg, Dec. 4, 2007.

A. Vaccari; "Introducing Hello," http://newsroom.fb.cominews/2015/04/introducing-hello, Apr. 22, 2015.

* cited by examiner

INTEGRATED TELEPHONE APPLICATIONS ON ONLINE SOCIAL NETWORKS

PRIORITY

This application is a continuation under 35 U.S.C. § 120 of U.S. patent application Ser. No. 14/721,762, filed 26 May 2015.

TECHNICAL FIELD

This disclosure generally relates to communication between users of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-phone application may execute on a computing system such as a mobile phone, laptop computer, tablet computer, or other computing device. The social-phone application may integrate social-network user information with one or more types of user-to-user communication, such as traditional telephony, video calls, (voice-over-IP) VOIP telephony, text messaging, and the like. When a social network user communicates with another user via a page, telephone call, video call, text message, e-mail message, or other form of electronic communication, the other user is often identified in the application using a numeric identifier, such as a phone number, that does not necessarily provide a meaningful identification of the other user. To provide a more meaningful identification of the other user, the other user's name may be displayed. For example, the other user's name may be retrieved from a contacts list or otherwise immediately available information such as caller ID. However, such information may be unavailable. The social-phone application may attempt to retrieve the other user's user-profile information from the online social network. The user-profile information may include the other user's name and other relevant information from the user's user-profile information. The other user's profile information may be protected by privacy controls that prevent the user from accessing it. Social-network privacy controls may restrict the information's visibility to certain types of users, such as friends or friends-of-friends. In particular embodiments, the social-phone application may identify and retrieve the other user's profile information using the numeric identifier.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
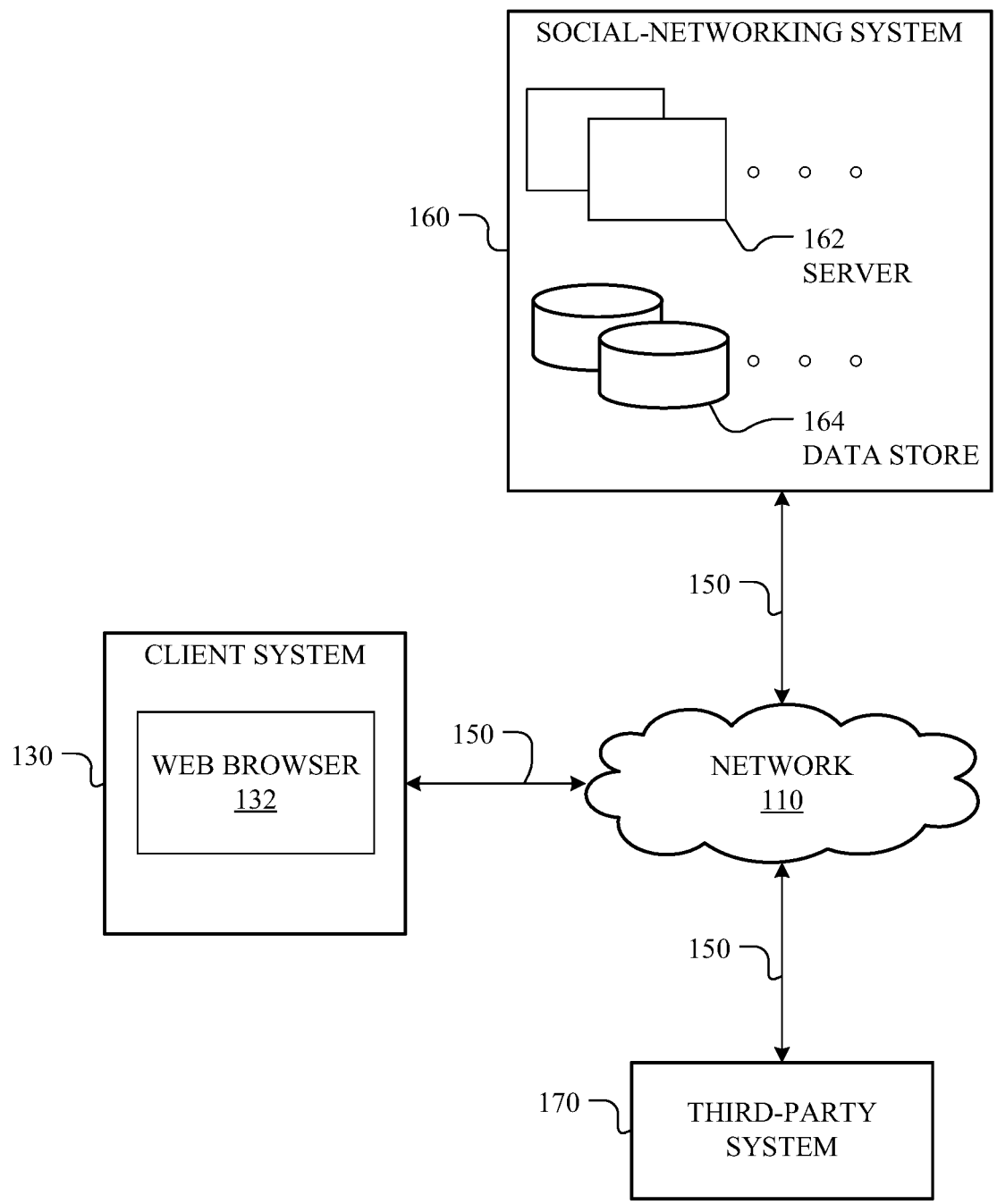
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132 and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate. More information on webpages may be found in U.S. patent application Ser. No. 11/856,202, filed 17 Sep. 2007, which is incorporated by reference.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
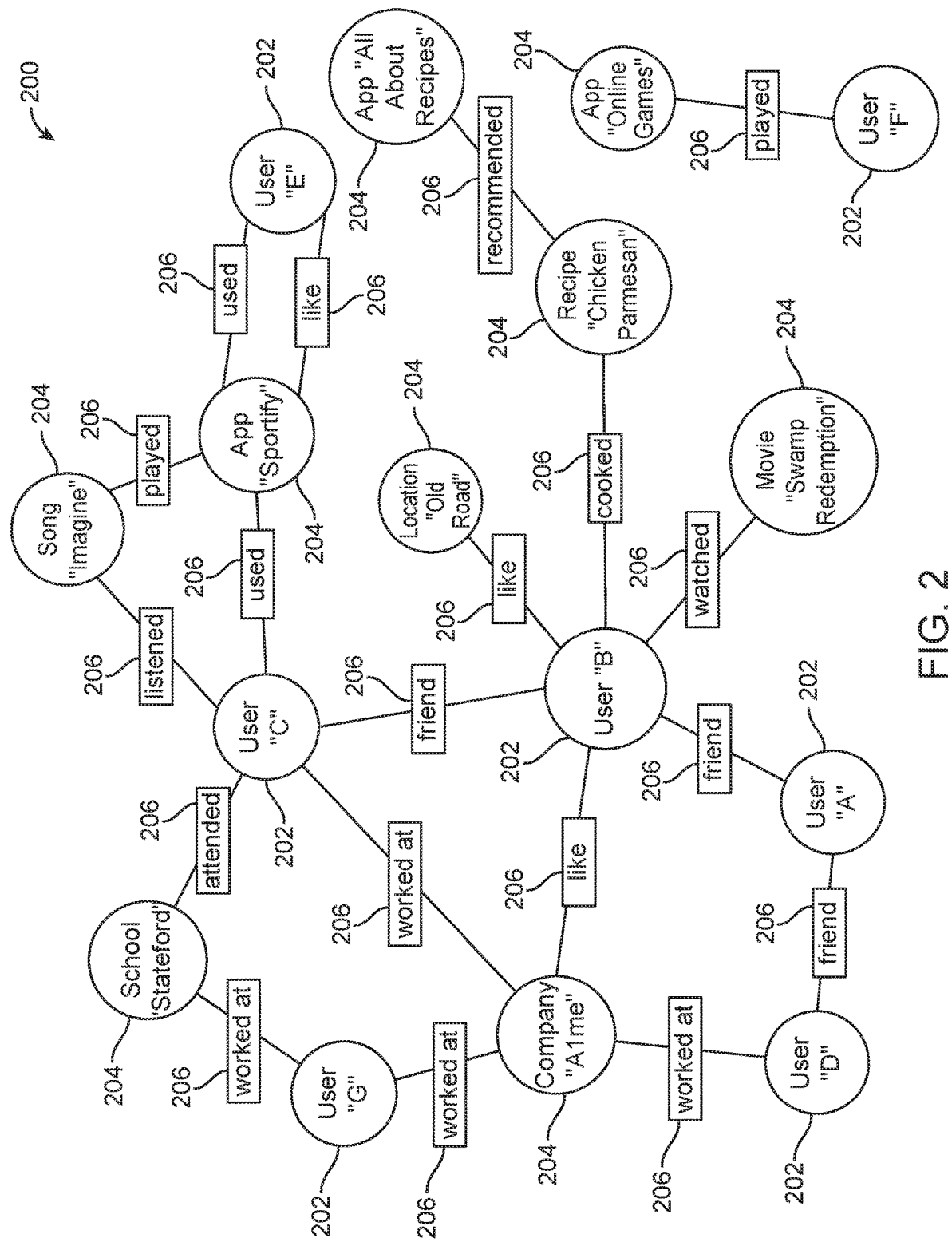
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in the social graph 200 may represent or be represented by a webpage (which may be referred to as a "profile page"). Profile pages may be hosted by or accessible to the social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204).

In particular embodiments, the social-networking system 160 may create an edge 206 between a user node 202 and a concept node 204 in the social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile page. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Social-Phone Application

In particular embodiments, a mobile phone communication application associated with an online social network, referred to herein as a social-phone application, may integrate social-network user information with one or more types of user-to-user communication, such as traditional telephony, video calls, voice-over-IP (VOIP) telephony, text messaging, email, and so on. User-profile information maintained by the social-networking system 160, such as contact information, associates user names with the corresponding phone numbers, messaging addresses, email addresses, and so on. This contact information may be useful to users of a communication application who do not have the contact information in their own contact lists or online address books, since the information can be used to display the name of a user or place being called, to look up a phone number that corresponds to a given user name, and so on. However, such user-profile information is not always visible to other users, because social network privacy controls may restrict the information's visibility to certain types of users, such as friends or friends-of-friends. More information on caller identification and user-profile information may be found in U.S. patent application Ser. No. 13/017,664, filed 31 Jan. 2011, which is incorporated by reference. More information on user-to-user communication may be found in U.S. patent application Ser. No. 13/214,924, filed 22 Aug. 2011, U.S. patent application Ser. No. 13/214,940, filed 22 Aug. 2011, U.S. patent application Ser. No. 13/215,018, filed 22 Aug. 2011, U.S. patent application Ser. No. 11/856,191, filed 16 Sep. 2007, U.S. patent application Ser. No. 11/856,182, filed 17 Sep. 2007. U.S. patent application Ser. No. 13/193,477, filed 28 Jul. 2011, U.S. patent application Ser. No. 13/571,882, filed 10 Aug. 2012, and U.S. patent application Ser. No. 14/675,138, filed 31 Mar. 2015, each of which is incorporated by reference.

When the social-phone application is installed on a user's client system 130, it may scan available contacts lists, address books, friends lists, and other contact information available via the client system 130 for information about and addresses of users. Each identified user may be added to the social-phone application's contacts list, which may be stored locally on the user's mobile device, or on the online social network, or a combination of those.

In particular embodiments, the social-phone application may retrieve and display user-profile information of other users, including information that is not initially visible. For example, a known item from a user's social-network user-profile information (e.g., phone number of a caller) may be used in the social phone application to find and display additional items from the user's profile (e.g., the caller's name, etc.). The user's profile information may include contact information, such as the user's name, address, phone number, email address, etc. The disclosed techniques can be particularly useful when one user knows only a portion of the contact information for another user, such as either a phone number or a name. The unknown portion of the contact information can be retrieved from the online social network, e.g., by querying a user-profile database using the known contact information as a lookup key. For example, when a first user calls or receives a call from a second user's phone number, but is not friends with the second user, the second user's name can be determined from the online social network using the known portion of the contact information as a lookup key (subject to privacy controls, as described below) and displayed on the first user's phone. In one example, if the known portion of the contact information uniquely identifies the second user, as is ordinarily true for phone numbers, then the second user may be identified by searching the contact information of each user for the known portion. Otherwise, if the known portion of the contact information does not uniquely identify the second user, as may be the case for a user name or portion thereof, then identifying the second user may involve disambiguating the known portion and selecting the user who best matches the known portion. More information on determining user profile information may be found in U.S. patent application Ser. No. 13/316,209, filed 9 Dec. 2011, which is incorporated by reference.

The known contact information may be sufficient for the online social network to grant access to the additional profile information. For example, if a user knows the phone number but not the name of a second user, the first user may enter the phone number into a social-phone application on a mobile client system 130. The social-phone application may be separate from the native dialing application on the mobile client system 130. The online social network may grant the first user permission to access the second user's profile information based on the first user's knowledge of the second user's phone number. In one aspect, the online social network may provide a privacy configuration setting that enables a user who has the second user's phone number to access the second user's profile information, even if the user is not a friend of the second user. In another aspect, the online social network may have a privacy setting that enables a first user who knows the phone number of a second user to find the second user's profile based on the second user's known phone number, even if the first and second users are not connected by a friend relationship. Although this privacy setting may ordinarily prevent non-friends from finding the second user's phone number, the online social network may make the second user's profile visible to a non-friend user to whom the second user has given an item of identifying information, such as his or her phone number, e.g., by calling or otherwise initiating communication with the non-friend user.

In particular embodiments, as introduced above, the online social network's privacy controls may prevent the user from directly accessing profile information of other users, such as users who are not friends of the user. However, the disclosed techniques use certain online social network features to access portions of the profile information, such as user names and associated phone numbers, to the extent allowed by the user's privacy controls. In particular embodiments, a user node 202 in social graph 200 may correspond to user profile information. The user profile information can be presented on a user-profile page. In particular embodiments, a user's user-profile information and user-profile page may be visible to the user, the user's friends, and even other non-friend users depending on the privacy settings associated with the user node of the user. The privacy settings may specify particular visibilities with respect to each item of user profile information. As an example and not by way of limitation, a user may specify that his name is publically viewable, his phone number is viewable only by friends and friends-of-friends, and his address is viewable only by friends. A user may set or modify his or her privacy settings via, for example, the user's user-profile page, a user homepage, an account-settings pages, a privacy-settings page, or via another suitable interface. More information about using privacy settings to determine visibility of interactions to another user may be found in U.S. patent application Ser. No. 13/556,017, filed 23 Jul. 2012, which is incorporated by reference.

As an example and not by way of limitation, when a first user receives an incoming communication, such as a phone call, from a second user, but the second user's name or other contact information is not visible to the first user in the online social network, the first user may cause the second user's name or other user profile information to be visible to the first user in the social-networking system 160 by providing the second user's phone number or other user identifier to the social-networking system 160. The first user's client system 130A may retrieve the second user's name or other user profile information from the social-networking system 160 by providing the second user's phone number or other user identifier to the social-networking system 160. The social-networking system 160 may send the second user's name or other profile information to the first user's client system 130A in response to the request. The first user's client system 130A may then receive the second user's name or other profile information and display it in association with the second user's phone number or other user identifier. Although this disclosure describes retrieving user profile information of a second user who initiates an incoming communication to a first user in a particular manner, this disclosure contemplates retrieving user profile information of the second user in any suitable manner.

In particular embodiments, the first user uses a social-phone application, which performs the operations described as occurring on the first user's client system 130A. The second user may be using any phone application on the second user's client system 130B. For example, the second user may be using the social-phone application, or a different phone application, such as an application provided with the operating system of the second user's client system 130B. As an example, if the two users are friends, or the second user has made his or her profile information visible to the first user (e.g., by making it visible to all users or friends-of-friends), the second user's profile information, including the second user's name, is visible to the first user, and may be displayed on the first user's client system 130A when the call is made. However, if the two users are not friends or friends-of-friends, then the second user's profile information is not visible, and therefore not accessible, to the first user. Even if the second user's profile information is not immediately visible to the first user, the second user's profile information may still be obtained and displayed to the second user in the social-phone application's user interface (e.g., while the call is being initiated or is in progress) by performing a sequence of operations, such as two successive requests that provide the second user's phone number or other user identifier to the social-networking system 160, as introduced above.

In particular embodiments, the second user's profile information may be made visible to the first user when the second user performs an action such as calling or otherwise initiating communication with the second user. The online social network may have a privacy setting that controls who can discover a user's profile. Using this setting, a user may make their profile information visible to another user by giving or sending their phone number to the other user, which can be done by calling the other user. For example, if the second user has called the first user, the second user's profile information may be made visible to the first user (subject to privacy controls that may prevent the first user's profile information from becoming visible to the second user in this situation). Then, when the second user is calling the first user, the social-phone application may request profile information that corresponds to the second user's phone number, retrieve the profile information, including the second user's name, from the social-networking system 160, and display the second user's name on the first user's client system 130A during the call. In another example, the first user may know the first second user's name or a portion thereof instead of the second user's phone number. If the first user initiates a call by entering the second user's name, e.g., "Colin Baker," then the social-phone application may request the phone number that corresponds to the specified second user's name. If more than one user name on the online social network matches the specified second user's name, then the specified second user's name may be disambiguated to identify the user who is the best match. As an example and not by way of limitation, when a first user initiates a communication, such as a phone call, with a second user, but the first user does not have access to any contact information (or other information) specifying the second user's name (or other user profile information), the first user may retrieve the second user's name or other user profile information from the social-networking system 160 by providing the second user's phone number or other user identifier to the social-networking system 160. The second user may make his or her profile information visible to the first user by specifying appropriate privacy settings. For example, if the second user has associated their phone number with a messaging application, and the second user's privacy settings specify that messaging application information is visible to non-friends, then the second user's phone number may be visible to the first user. In this example, the second user's phone number is associated with a messaging application, and the second user's privacy settings indicate that messaging information is visible to other users of the messaging application, so the second user's name is provided to the first user. The second user's name may then be displayed on the first user's phone when the first user dials the second user. Although this disclosure describes initiating communication with a user and retrieving user profile information in a particular manner, this disclosure contemplates initiating communication with users and retrieving user profile information in any suitable manner.

In particular embodiments, the first user may know the second user's name or a portion thereof instead of the second user's phone number, in which case when the first user initiates the call by entering the second user's name. As an example and not by way of limitation, the first user may wish to call his friend, "Colin Baker," and may input his friend's name into the social-phone application. The social-phone application may then request the phone number that corresponds to the entered second user's name (i.e., request Colin Baker's phone number). If more than one online social network username matches the entered second user's name, then the entered second user's name can be disambiguated to identify the user who is the best match.

In particular embodiments, the first user uses a social-phone application, which performs the operations described as occurring on the first user's client system 130A. The second user may be using any phone application on the second user's client system 130B. For example, the second user may be using the social-phone application, or a different phone application, such as an application provided with the operating system of the second user's client system 130B. As an example and not by way of limitation, contact information for the second user can be added to a contacts list or address book of the first user. The contact information can be generated by creating a contact list entry that associates the unique identifier (e.g., the second user's phone number) with the profile information of the second user (e.g. the second user's name). The contact information may be stored in the contact list automatically, e.g., without user input, or in response to user selection of a user interface feature, as described below. The contact list may be stored on the online social network, e.g. by a data store 164 of the social-networking system 160. The contact list may additionally or alternatively be stored on the first user's client system 130A, e.g., in a contact list maintained by the social-phone application, or in a contact list maintained by the operating system of client system 130.

In particular embodiments, the social-phone application may include a feature for adding the profile information of the second user to the address book of the application's user (e.g., the first user). The social-phone application may present a user interface element such as a button labeled "Add Contact" that, when selected or pressed, causes the contact information to be added to the list of contact associated with the first user. Although this disclosure describes storing user profile information in a contact list in a particular manner, this disclosure contemplates storing user profile information in a contact list in any suitable manner. As an example and not by way of limitation, the techniques disclosed herein may be used with any suitable messaging/communication functionality, including VOIP, text messaging, email, multimedia messaging, video conferencing, and so on, in addition to or instead of phone calls. One or more available types of communication between the first and second user may be enabled automatically based on the retrieved profile information of the second user. For example, a user identifier or other messaging communication addresses can be added to the profile information, and communication between the first and second users via a messenger application, SMS, VOIP, or other messaging protocol can be enabled.

In particular embodiments, a user may communicate with any user in his or her contacts list via the social-phone application using any supported type of communication. For example, the social-phone application may be used to call or message a user using a phone call, SMS message, a messenger application, VOIP call, email, and so on. That is, the social-phone application enables the user to communicate via any supported communication type, without requiring the user to switch to a different application for different types of communication. As an example and not by way of limitation, after the first user has completed a first call using the social-phone application, he or she may make a second call to a second user using the application via a different type of communication. The first user now has profile information (e.g., sent to the first user as part a previous call to the second user) that may include other communication addresses for reaching the second user (e.g., an IM address or a VOIP number). If the profile information contains a communication address for the second user of the desired type, then the user may initiate the communication directly using the social-phone application. If the profile information does not contain a communication address for the second user of the desired type, then the social-networking system 160 may be queried for the desired type of communication address for the second user. Although this disclosure describes communication using any suitable messaging/communication functionality in a particular manner, this disclosure contemplates communicating via any suitable messaging/communication functionality in any suitable manner.

In particular embodiments, social-networking system 160 may determine contact information for entities associated with the online social network based on usage of the social-phone application. By analyzing communications via the social-phone application, social-networking system 160 can infer contact information, such as a phone number, for a user or organization based on the number of times a particular phone number is successfully used to call the user or organization. If the particular phone number is used to call the user or organization at least a threshold number of times, and the calls are successful, then the phone number may be associated with the user or organization in the social-networking system 160. As an example and not by way of limitation, an additional condition that the calls are from at least a threshold number of different users may be used, so that a single user or a small number of users are not able to cause a phone number to be associated with a user or organization. The association may be established by, for example, associating the phone number with the organization in the organization's profile information or in a phone directory or contacts lists accessible by a group of users. In one example, a call may be considered successful if the call is answered and lasts for at least a threshold duration of time, or the phone number can be verified as being associated with the user or organization by checking a page or contact information of the user or organization, or another suitable condition is met. Other types of contact information, such as an email address, may be inferred similarly. Although this disclosure describes determining contact information in a particular manner, this disclosure contemplates determining contact information in any suitable manner.

As an example and not by way of limitation, the social-phone application may identify profile information of locations or places. If a location or place, such as a business, is represented by profile information, such as a phone number, on the online social network, then the profile information may be shown in the social-phone application. For example, the profile information of a business, including the businesses name, address, and so on, may be displayed by the social-phone application in association with the business's phone number when the user uses the phone application to call the business's phone number. Similarly, the profile information of a business may be displayed when the phone application receives a call from the business. The phone application may also generate contact list entries locations or places based on the profile information automatically or in response to user selection of an Add Contact button or the like. Although this disclosure describes identifying profile information of locations or places in a particular manner, this disclosure contemplates identifying profile information of locations or places in any suitable manner.

In particular embodiments, contact information in a contacts list may be corrected based on corresponding user profile information stored on the online social network. As an example and not by way of limitation, a user may create a partial contact for a person, and assign a name to the partial contact. Then, when the user attempts to assign an online social network user profile to the partial contact, the social-phone application verifies that the user profile correctly matches the information in the partial contact. If any of the fields in the user profile do not match the corresponding fields in the partial contact, the social-phone application provides an option to clean up the partial contact by filling in the correct information from the user profile, thereby converting the partial contact to a correct contact. Although this disclosure describes correcting contact information in a particular manner, this disclosure contemplates correcting contact information in any suitable manner.

In particular embodiments, incorrect search results may occur in certain situations, and may be corrected based on user feedback recorded by the online social network. As an example and not by way of limitation, a professional organization may list the main number of an affiliated university as the organization's main number, but the primary university page on the online social network does not list a phone number. The university should appear as the first search result in searches for that number, but the organization appears first instead. To correct this discrepancy, a user may select a Change Profile button to change the link from the phone number to the university's primary page. If more than a threshold number of people repeat this Change Profile operation, social-networking system 160 may automatically change the link so that the phone number points to the primary university page. Although this disclosure describes correcting incorrect search results in a particular manner, this disclosure contemplates correcting incorrect search results in any suitable manner.

Figure 3A:
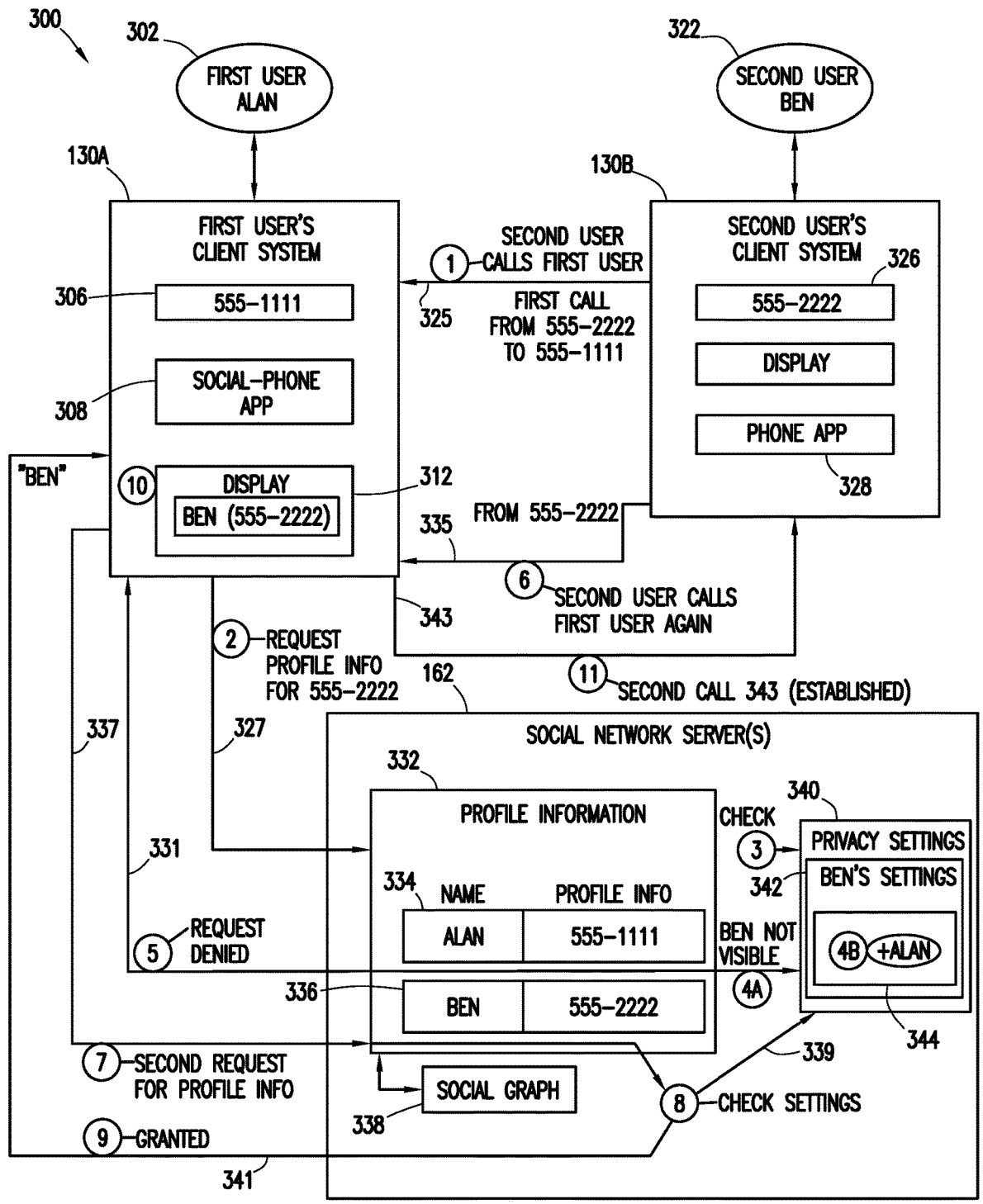
FIG. 3A illustrates an example system in which a communication from a second user to a first user causes user profile information 336 of the second user to become visible to the first user.

FIG. 3A illustrates an example system 300 in which a communication 325 from a second user 322 to a first user 302 causes user profile information 336 of the second user 322 to become visible to the first user 302. In particular embodiments, visibility of a user's profile information to other users may be controlled by privacy settings 340. As an example and not by way of limitation, the second user's privacy settings 342 control the visibility of the second user's profile information to the first user 302. In this example, the second user's privacy settings 342 include a list of users 344 to whom the privacy settings 342 are visible. Although the second user's profile information is not initially visible to the first user 302, by initiating communication with the first user 302, the second user 322 may make his or her profile information visible to the first user 302. As an example and not by way of limitation, when the first user 302 receives an identifier, such as a phone number 326, from the second user, the client system 130 of the first user 302 may transmit the identifier to a social-network server 162 to gain access to the profile information 336 of the second user 322, or at least to a subset of the profile information 336, such as the second user's name ("Ben"). When the social-network server 162 receives the identifier (e.g., phone number) of the second user from the first user's client system 130, the social-network server 162 adds the second user (or a user identifier that represents the second user) to the list of users 344 to whom the second user's profile information is visible. The retrieval and use of the profile information 336 of the second user 322 by the first user 302 is described in more detail below. The identifier uniquely identifies the second user 322 in the example of FIG. 3A. In other examples, the identifier need not uniquely identify the second user 322.

Although the communication 325 is a phone call in the description of FIG. 3A, the communication 325 is not limited to being a phone call. In particular embodiments, the communication 325 may be a different type of communication, such as a page, text message, email message, VOIP call, video call, or other suitable type of communication. In particular embodiments, the communication 325 includes or is associated with an identifier that identifies the second user 322, such as a phone number 326 of the second user ("555-2222"). In particular embodiments, the user profile information 332 may include the name of the second user 322 ("Ben"). Upon becoming visible to the first user 302, the name ("Ben") of the second user 322 may be sent from a social-network server 162 to the first user's client system 130A. The name ("Ben") may then be presented on a display 312 of the first user's client system 130A in association with the phone number of the second user. For example, the display may show the text "Ben (555-2222)" to indicate that the communication 325 is from a user named Ben who has the phone number "555-2222." The first user 302 may be associated with a phone number 306 ("555-1111") that uniquely identifies the first user 302, and the communication 325 may be sent from the second user's client system 130B to the first user's phone number 306 ("555-1111").

In particular embodiments, the communication 325 may be sent at point (1) of FIG. 3A. As indicated above, the communication 325 may be a type of communication other than a phone call, in which case the identifier that identifies the second user may be a different type of identifier that corresponds to the particular type of communication. For example, the communication 325 may be a text message or email message from the second user 322 to the first user 302, a video or VOIP call, or another type of communication sent from the second user 322 to the first user 302 via a wired or wireless communication network. The identifier may be a text message number or user identifier in the case of a text message communication, or an email address in the case of an email communication, or a VOIP number in the case of a VOW communication.

In particular embodiments, at point (2) of FIG. 3A, the first user's client system 130A sends a request 327 for the second user's profile information 336 to the social-network server 162. The first user's client system 130A includes the identifier of the second user in the request 327, to identify the user for whom profile information is being requested. As described above, the identifier was received in the communication 325 and is, for example, a phone number 326 of the second user ("555-2222").

In particular embodiments, at point (3), the social-network server 162 receives the request 327 and checks the second user's privacy settings 342 to determine whether the second user's profile information 336 is visible to the first user 302. At point (3), the second user 405 has not made his or her profile information 336 visible to the first user 302, so the request 327 is denied. A denial response 331 indicating that the requested profile information 336 is not visible is sent to the first user's client system 130A at point (4A). However, since the request 327 includes the identifier associated with the second user (e.g., the second user's phone number 326), the social-network server 162 uses the fact that the first user 302 knows the identifier associated with the second user 322 to add the first user 302 ("Alan") to the list of users 344 in the second user's ("Ben's") privacy settings 342 at point (4B), thereby making the second user's profile information 336 visible to the first user. The second user's profile information is not yet visible when the denial response 331 is sent to the first user's client system 130A (e.g., because a security policy specifies that profile information not be provided until a subsequent request, or privacy settings have not yet been updated when the response 331 is sent). However, a subsequent second request 337 for the profile information 336 of the second user will be granted because Ben's profile visibility privacy settings 342 indicate that his profile information 336 is visible to Alan.

At point (5), a response indicating that the requested profile information is not visible to the first user 302, and the request was denied, is sent to the first user's client system 130A. A communication session, such as a phone call, may be established between the first user's client system 130A and the second user's client system 130B, e.g., if the first user 302 answers or accepts the first call initiated by the communication 325. Since the second user's profile information is not visible, the second user's unique identifier (e.g., phone number 326) may be displayed on the display 312 of the first user's client system 130A (e.g., as "555-2222"), but the second user's name (or other profile information) is not displayed.

At point (6), the second user 322 calls the first user 302 a second time. Since the first user's identity was added to the second user's privacy settings 342 at point (4), the second user's profile information 336 is visible to the first user 302, and is displayed on the display 312 of the first user's client system 130A. For example, the second user's name, "Ben", may be displayed on the display 312 in association with the phone number 326 of the second user 322 ("Ben 555-2222"). The second user's profile information 336 may be retrieved by the first user's client system 130A by a second request 377 similar to the first request 327 that was made for the first communication 325, but the second request 337 is granted.

In particular embodiments, the second user 322 initiates a second communication 335 to the first user 302 at point (6). At point (7), the first user's client system 130A sends the second request 337 for the second user's profile information 336 to the social-network server 162. The social-network server 162 receives the second request and, at point (8), checks the profile information visibility privacy settings 346 of the second user (e.g., "Ben"). Since the identity of the first user 302, e.g., "Alan", was added to the privacy settings 346 as a user to whom the profile information 336 is visible (at point (4)), the social-network server 162 determines that the profile information 336 is visible to the first user 302. At point (9), the social-network server 162 sends a response 341 that includes the requested profile information 336, e.g., the name "Ben", to the first user's client system 130A. The first user's client system 130A receives the response 341 and displays the received name in association with the second user's phone number 326 on the display 312, e.g., as "Ben 555-2222" at point (10). A communication session 343, such as a phone call, may be established between the first user's client system 130A and the second user's client system 130B, e.g., if the first user 302 answers or accepts the second call initiated by the second communication 335 from the second user 322.

Figure 3B:
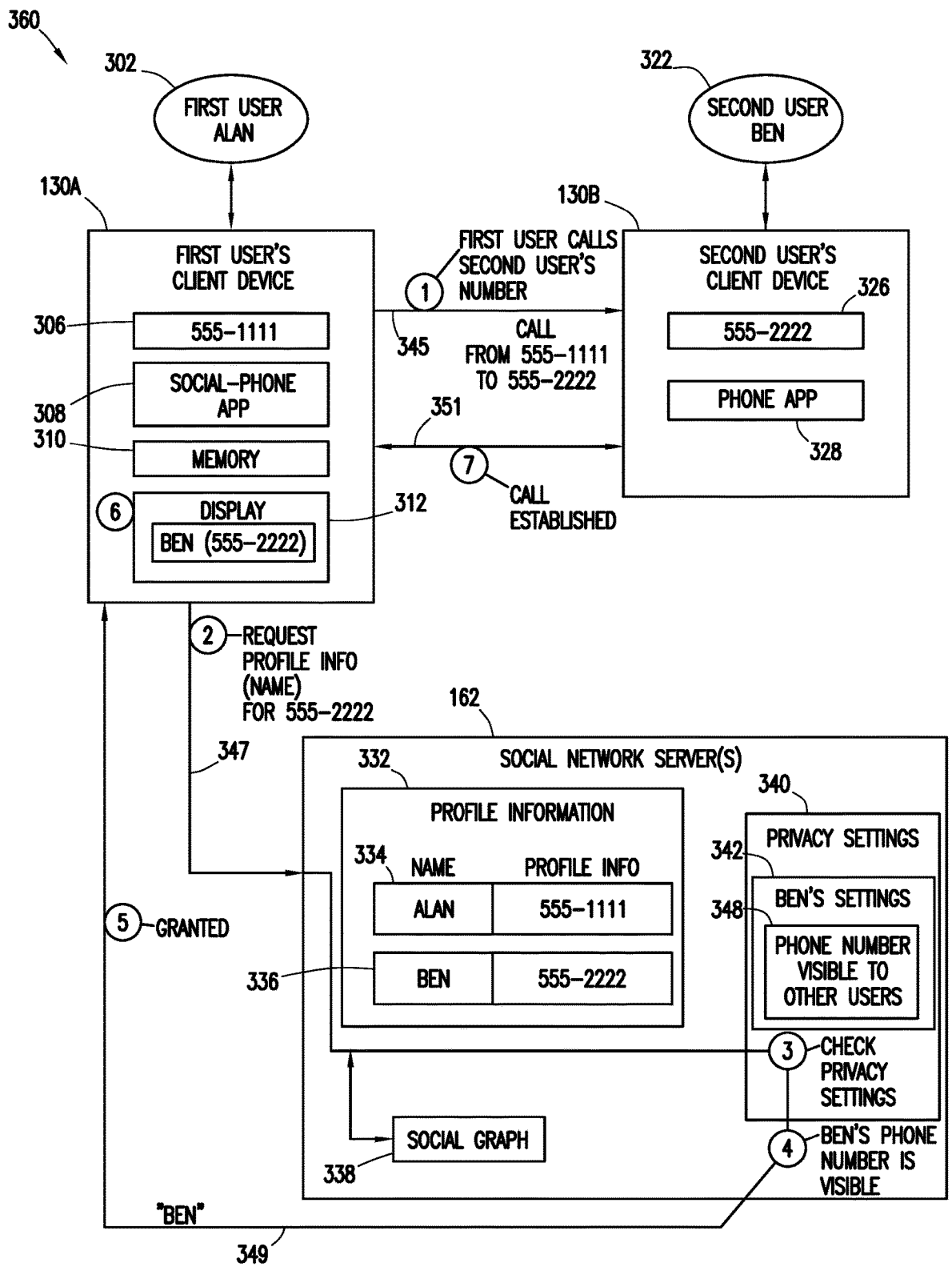
FIG. 3B illustrates an example system in which a first user initiates a communication with a second user, and the second user's profile information is retrieved by and displayed on the first user's client system.

FIG. 3B illustrates an example system 360 in which a first user 302 initiates a communication 345 with a second user 322, and the second user's profile information 336 is retrieved by and displayed on the first user's client system 130A. In particular embodiments, the second user may make one or more items of his or her profile information 336 visible to the first user 302. As an example and not by way of limitation, the second user's profile information 336 may be visible to the first user because, for example, the second user has made his or her phone number available to other users of a particular communication type and the first user is using that type of communication. The second user's profile information may also be visible to the first user because, for example, the first and second users are friends-of-friends, or because the second user's phone number has a privacy setting of "public." The retrieval and use of the second user's profile information 336 by the first user 302 when first user 302 initiates communication is described in more detail below.

The communication 345 from the first user 302 to the second user 322 may be a phone call. Although the communication 345 is described using the example of a phone call in FIG. 3B, the communication 345 is not limited to being a phone call, and may be a different type of communication, such as a text message, email message, voice call, VOIP call, or other type of communication. The communication 345 may include or be associated with an identifier that identifies the first user 302, such as a phone number 306 of the first user ("555-1111"). The second user's profile information 336 may include the name of the second user 306 ("Ben"). If the second user's profile information 336 is visible to the first user 302, the name ("Ben") of the second user 322 may be sent from a social-network server 162 to the first user's client system 130A to be presented on a display 312 of the first user's client system 130A in association with the phone number of the second user. For example, the display may show the text "Ben (555-2222)" to indicate that the communication 345 is to a user named Ben who has the phone number "555-2222." The client system 130B of the second user may be associated with a phone number 326 ("555-2222") that uniquely identifies the second user 322, and the communication 345 may be sent from the first user's client system 130A to the second user's phone number 326.

In particular embodiments, the communication 345 may be sent from the first user's client system 130A to the second user's client system 130B at point (1) in FIG. 3B. As indicated above, the communication 325 may be a type of communication other than a phone call, in which case the identifier that identifies the second user may be a type of identifier that corresponds to the type of communication. For example, the communication 345 may be a text message or email message from the first user 302 to the second user 322, a video or VOIP call, or another type of communication sent from the first user 302 to the second user 322 via a wired or wireless communication network. The identifier may be, for example, a text message number or user identifier in the case of a text message communication, an email address in the case of an email communication, or a VOIP number in the case of a VOIP communication.

In particular embodiments, the first user's client system 130A requests the profile information 336 of the second user by sending a request 347 to the social-network server 162 at point (2) of FIG. 3B. The request 347 may be sent before, after, or concurrently with the communication 345. In particular embodiments, the communication 347 is sent after the first user's client system 130A receives the phone number to be called and a user request to initiate a call to the phone number, and soon enough to allow the profile information to be received and displayed while the call is being established, or at least while the call is in progress.

At point (3), the social-network server 162 checks the second user's privacy settings 342 to determine whether the second user's profile information 336 is visible to the first user 130A. In the example of FIG. 3B, the privacy settings 342 contain an indication 348 that the second user's phone number 326 is visible to other users. The indication 348 may be present because the second user has made his or her phone number available to other users of a particular communication type and the first user is using that type of communication. The indication 348 that the phone number is visible may also imply that certain other items of the profile information 336, such as the second user's name, are also visible. Therefore, the indication 348 indicates that the second user's name is visible to the first user 302, and the social-network server 162 accordingly determines at point (4) that the second user's name is visible to and may be sent to the first user 302. At point (5), the social-network server 162 sends a response 349 that indicates the request 347 is granted and includes the second user's name. The first user's client system 130A receives the response 349 and displays the received name and the associated phone number 326 of the second user 322 on the display 312 (e.g., "Ben 555-2222") at point (6). A communication session 351, such as a phone call, may be established at point (7) between the first user's client system 130A and the second user's client system 130B, e.g., if the second user 322 answers or accepts the second call initiated by the communication 345 from the first user 302.

Figure 4A:
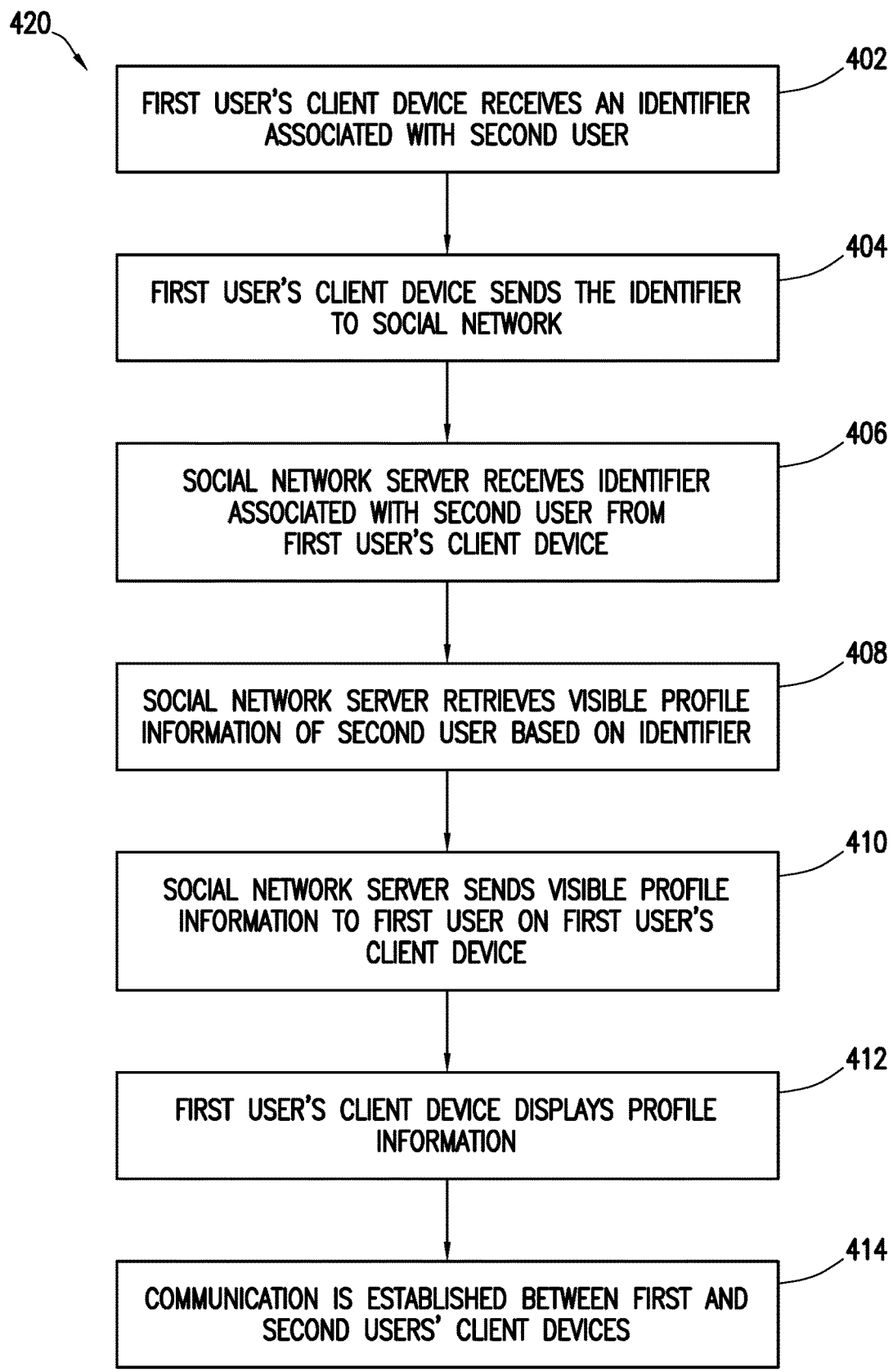
FIG. 4A illustrates an example method for accessing user profile information of an identified user.

FIG. 4A illustrates an example method 400 for accessing user profile information of an identified user. The method may begin at step 402, where the first user's client system 130A may receive an identifier associated with the second user. At step 404, the first user's client system 130A may send the identifier to the social-networking system 160. At step 406, the social-networking system 160 may receive the identifier associated with the second user from the first user's client system 130A At step 408, the social-networking system 160 may retrieve visible profile information of the second user based on the received identifier. At step 410, the social-networking system 160 may send the visible profile information to the first user on the first user's client system 130A. At step 412, the first user's client system 130A may receive and display the visible profile information. At step 414, the first user's client system 130A may establish communication with the second user's client system 130B.

Particular embodiments may repeat one or more steps of the method of FIG. 4A, where appropriate. Although this disclosure describes and illustrates particular steps of the method of FIG. 4A as occurring in a particular order, this disclosure contemplates any suitable steps of the method of FIG. 4A occurring in any suitable order. Moreover, although this disclosure describes and illustrates an example method for accessing user profile information of an identified user including the particular steps of the method of FIG. 4A, this disclosure contemplates any suitable method for accessing user profile information of an identified user including any suitable steps, which may include all, some, or none of the steps of the method of FIG. 4A, where appropriate. Furthermore, although this disclosure describes and illustrates particular components, devices, or systems carrying out particular steps of the method of FIG. 4A, this disclosure contemplates any suitable combination of any suitable components, devices, or systems carrying out any suitable steps of the method of FIG. 4A.

Figure 4B:
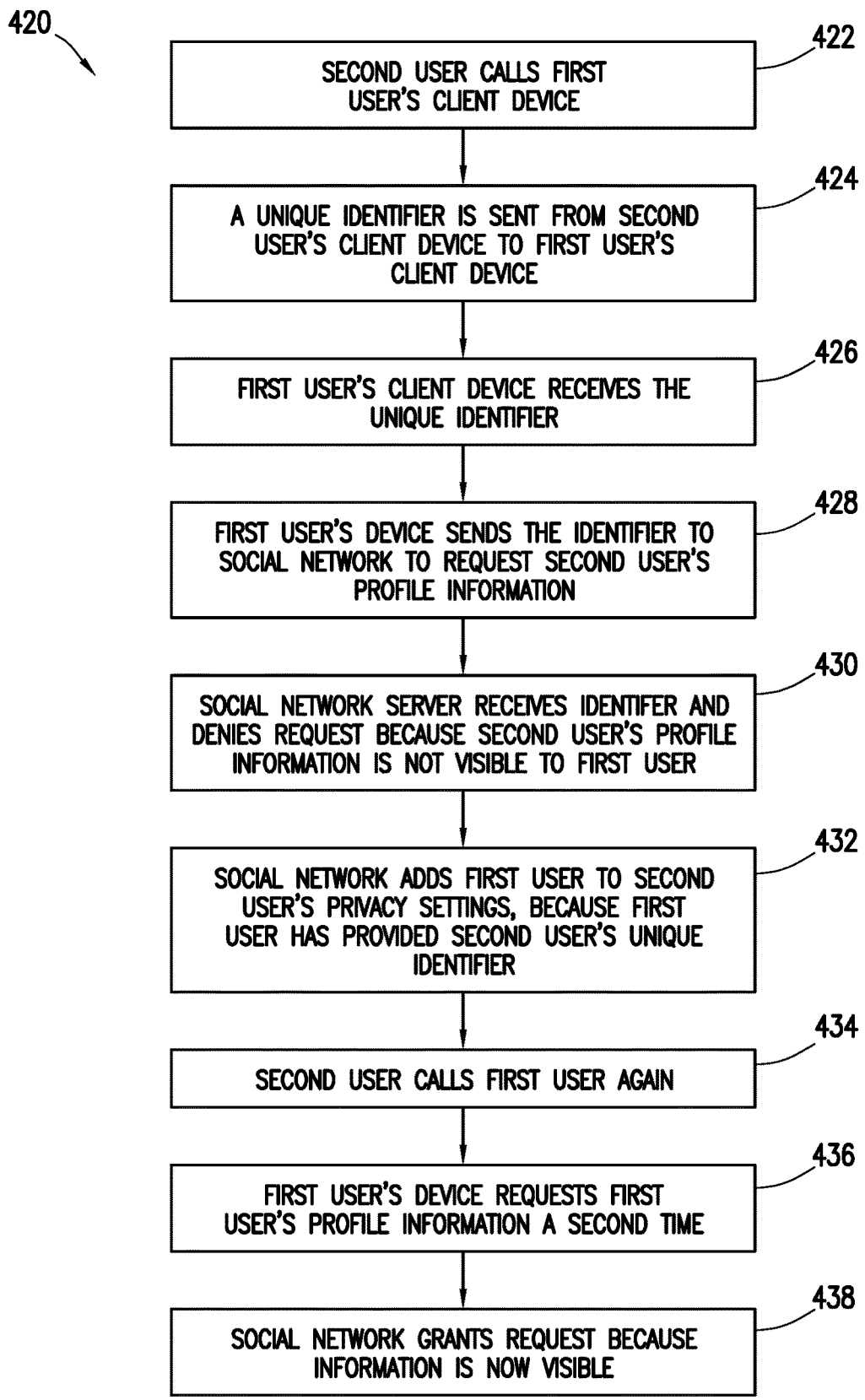
FIG. 4B illustrates an example method for accessing social network user profile information of a user who is called by a user of a social-phone application.

FIG. 4B illustrates an example method 420 for accessing social network user profile information of a user who is called by a user of a social-phone application. The method may begin at step 422, where the second user's client system 130B may initiate a communication such as a phone call with the first user's client system 130A, e.g., in response to the second user 322 using a phone application to call the first user 302. At step 424, the second user's client system 130B may send a unique identifier, which identifies the second user, to the first user's client system 130A. At step 426, the first user's client system 130A may receive the unique identifier. At step 428, the first user's client system 130A may send the identifier to social-networking system 160 in a request for the second user's profile information. At step 430, the social-networking system 160 may determine the visibility of the requested profile information to the first user. In the example of FIG. 4B, the requested profile information is not initially visible to the first user, so the social-networking system 160 sends a response denying the request. At step 432, the social-networking system 160 adds the first user to the second user's privacy settings because the first user has provided the second user's unique identifier. Step 432 may add an identifier of the first user to a list of users to whom the second user's profile information is visible. The second user's profile information is therefore not provided to the first user in response to the communication initiated at step 422. The first user's client system 130A is consequently unable to display the second user's name in the social-phone application at this point in the method. At step 434, the second user's client system 130B initiates a second communication with the first user's client system 130A, e.g., in response to the second user attempting to call the first user again. At step 436, the first user's device requests the second user's profile information from the social-networking system 160. Since the first user was added to the second user's privacy settings at step 432, the social-networking system 160 may determine that the second user's profile information is now visible to the first user, and grants the request. The social-networking system may then send the requested profile information to the first user's client system 130A, which may display the profile information in association with the unique identifier.

Particular embodiments may repeat one or more steps of the method of FIG. 4B, where appropriate. Although this disclosure describes and illustrates particular steps of the method of FIG. 4B as occurring in a particular order, this disclosure contemplates any suitable steps of the method of FIG. 4B occurring in any suitable order. Moreover, although this disclosure describes and illustrates an example method for accessing social network user profile information of a user who is called by a user of a social-phone application including the particular steps of the method of FIG. 4B, this disclosure contemplates any suitable method for accessing social network user profile information of a user who is called by a user of a social-phone application including any suitable steps, which may include all, some, or none of the steps of the method of FIG. 4B, where appropriate. Furthermore, although this disclosure describes and illustrates particular components, devices, or systems carrying out particular steps of the method of FIG. 4B, this disclosure contemplates any suitable combination of any suitable components, devices, or systems carrying out any suitable steps of the method of FIG. 4B.

Figure 4C:
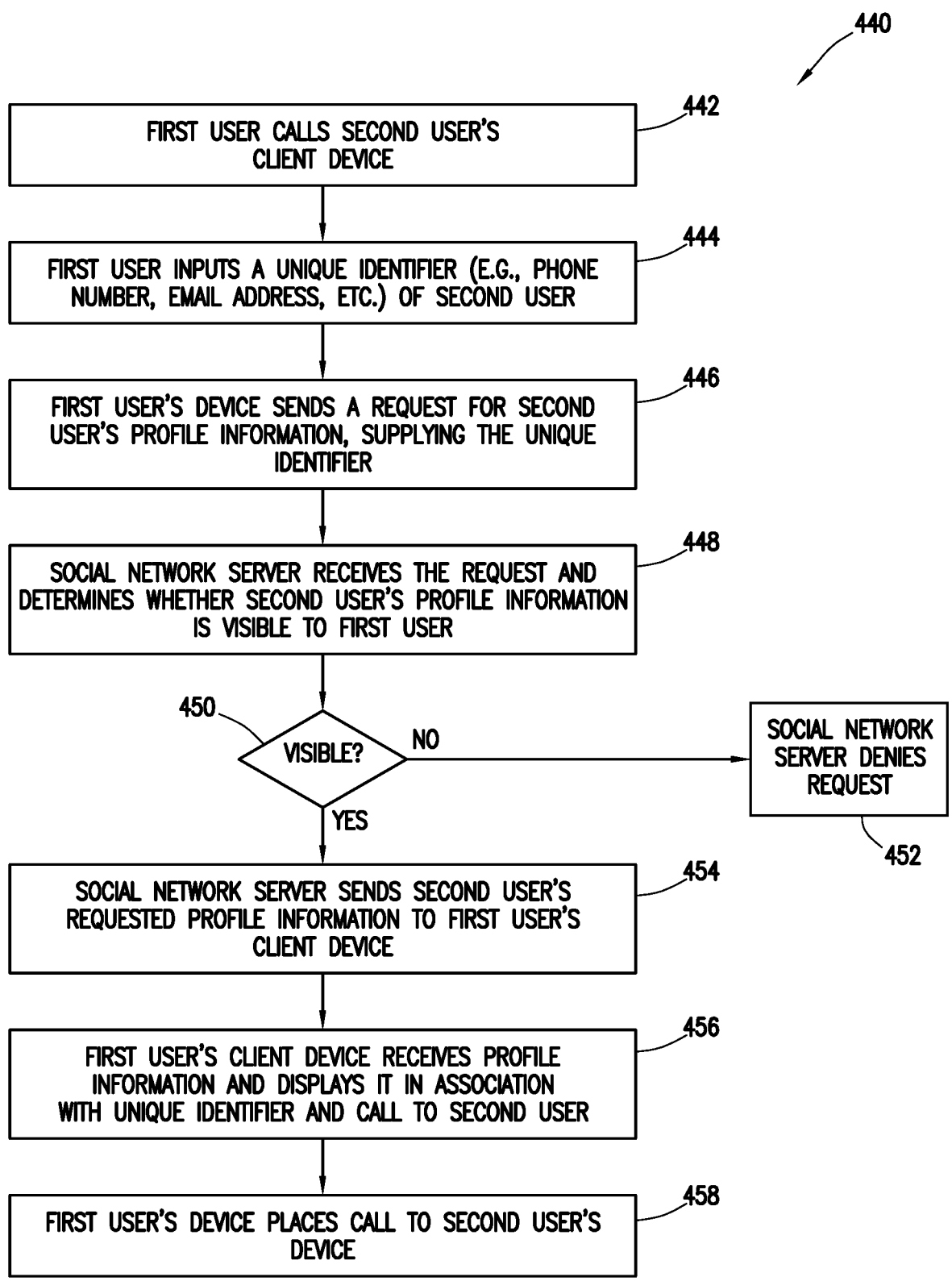
FIG. 4C illustrates an example method for accessing social network user profile information of a user who calls a user of a social-phone application.

FIG. 4C illustrates an example method 440 for accessing social network user profile information of a user who calls a user of a social-phone application. The method may begin at step 442, where the first user's client system 130A may initiate communication with the second user's client system 130B, e.g., in response to the first user requesting a phone call to the second user. At step 444, the first user may input a unique identifier that uniquely identifies the second user, such as a phone number of the second user. At step 446, the first user's device may send a request for the second user's profile information to the social-networking system 160, supplying the unique identifier in the request. At step 448, the social-networking system 160 may receive the request and determine whether the second user's profile information is visible to the first user. At step 450, if the profile information is visible, control transfers to step 454. If the profile information is not visible, control transfers to step 452, and the social-networking system 160 denies the request for profile information. At step 454, the social-networking system 160 may send the second user's profile information to the first user's client system 130A. At step 456, the first user's client system 130A may receive the profile information and display it in association with the unique identifier, e.g., as part of a call user interface that shows a call being placed to the second user. At step 458, the first user's device places the call to the second user's device. If the second user's device accepts the call, then a phone call is established between the first and second users.

Particular embodiments may repeat one or more steps of the method of FIG. 4C, where appropriate. Although this disclosure describes and illustrates particular steps of the method of FIG. 4C as occurring in a particular order, this disclosure contemplates any suitable steps of the method of FIG. 4C occurring in any suitable order. Moreover, although this disclosure describes and illustrates an example method for accessing social network user profile information of a user who calls a user of a social-phone application including the particular steps of the method of FIG. 4C, this disclosure contemplates any suitable method for accessing social network user profile information of a user who calls a user of a social-phone application including any suitable steps, which may include all, some, or none of the steps of the method of FIG. 4C, where appropriate. Furthermore, although this disclosure describes and illustrates particular components, devices, or systems carrying out particular steps of the method of FIG. 4C, this disclosure contemplates any suitable combination of any suitable components, devices, or systems carrying out any suitable steps of the method of FIG. 4C.

Figure 4D:
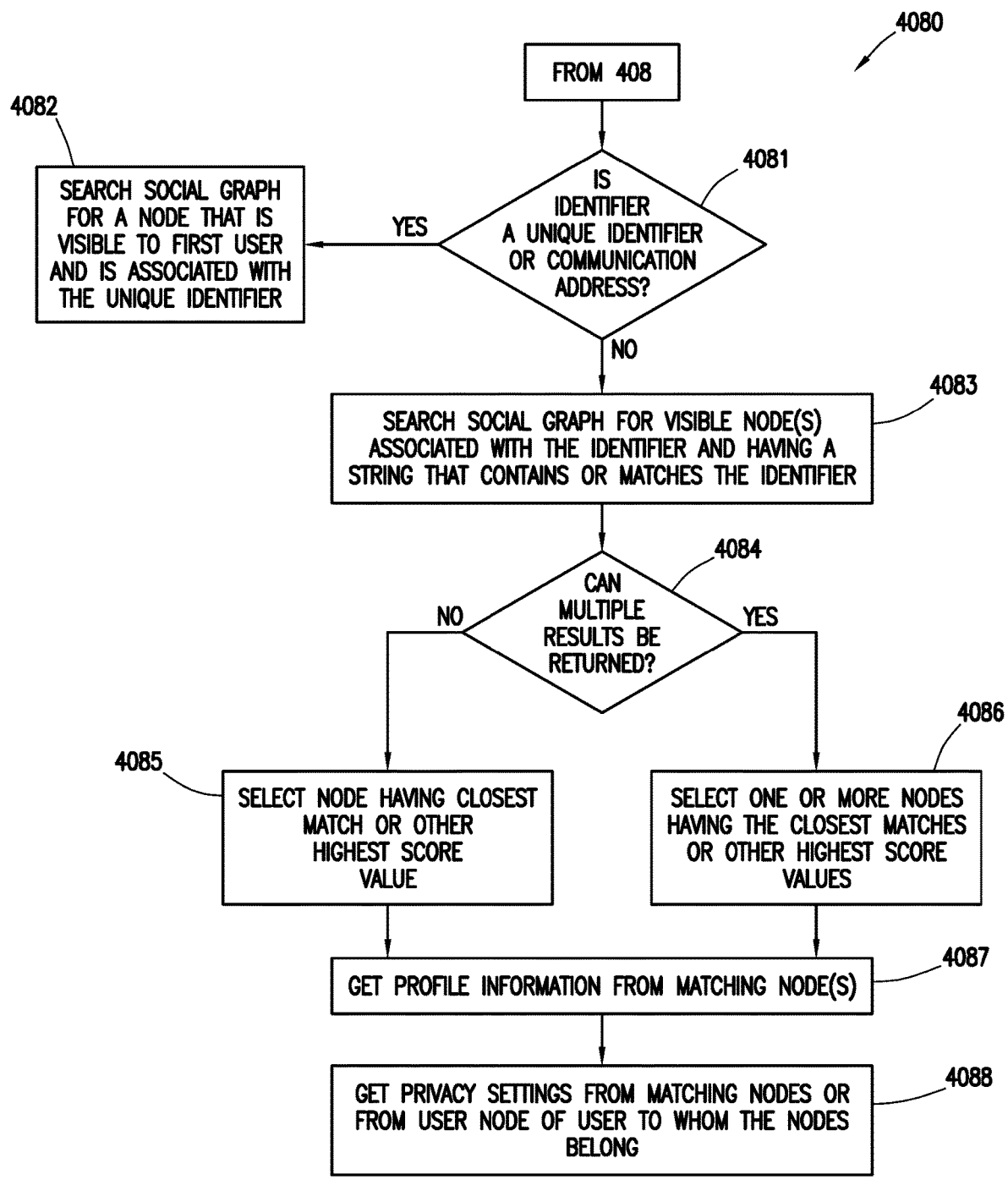
FIG. 4D illustrates an example method of retrieving visible profile information of an identified user.

FIG. 4D illustrates an example method 4080 for retrieving visible profile information of an identified user. The method may begin at step 4081, which may be invoked by step 408 of FIG. 4A. At step 4081, the social-networking system 160 may determine whether the identifier from FIG. 4A is a unique identifier or a communication address. If so, at step 4082, the social-networking system 160 may search the social graph for a node that is visible to the first user and is associated with the unique identifier. If step 4081 determines that the identifier is not a unique identifier or a communication address, then step 4083 searches the social graph for one or more visible nodes that are associated with the identifier and have or include a string that contains or matches the identifier. Step 4084 determines whether multiple search results may be returned. If so, at step 4086 the social-networking system selects one or more nodes having the closest matches or other highest score values to be returned as search results. Otherwise, if multiple search results cannot be returned, step 4085 selects a node having the closest match or other highest score value. At step 4087, the social-networking system 160 may retrieve profile information from the matching node(s). At step 4088, the social-networking system 160 may retrieve privacy settings from the matching node(s) (or from a user node of the user to whom the nodes belong).

Particular embodiments may repeat one or more steps of the method of FIG. 4D, where appropriate. Although this disclosure describes and illustrates particular steps of the method of FIG. 4D as occurring in a particular order, this disclosure contemplates any suitable steps of the method of FIG. 4D occurring in any suitable order. Moreover, although this disclosure describes and illustrates an example method for retrieving visible profile information of an identified user including the particular steps of the method of FIG. 4D, this disclosure contemplates any suitable method for retrieving visible profile information of an identified user including any suitable steps, which may include all, some, or none of the steps of the method of FIG. 4D, where appropriate. Furthermore, although this disclosure describes and illustrates particular components, devices, or systems carrying out particular steps of the method of FIG. 4D, this disclosure contemplates any suitable combination of any suitable components, devices, or systems carrying out any suitable steps of the method of FIG. 4D.

Figure 5:
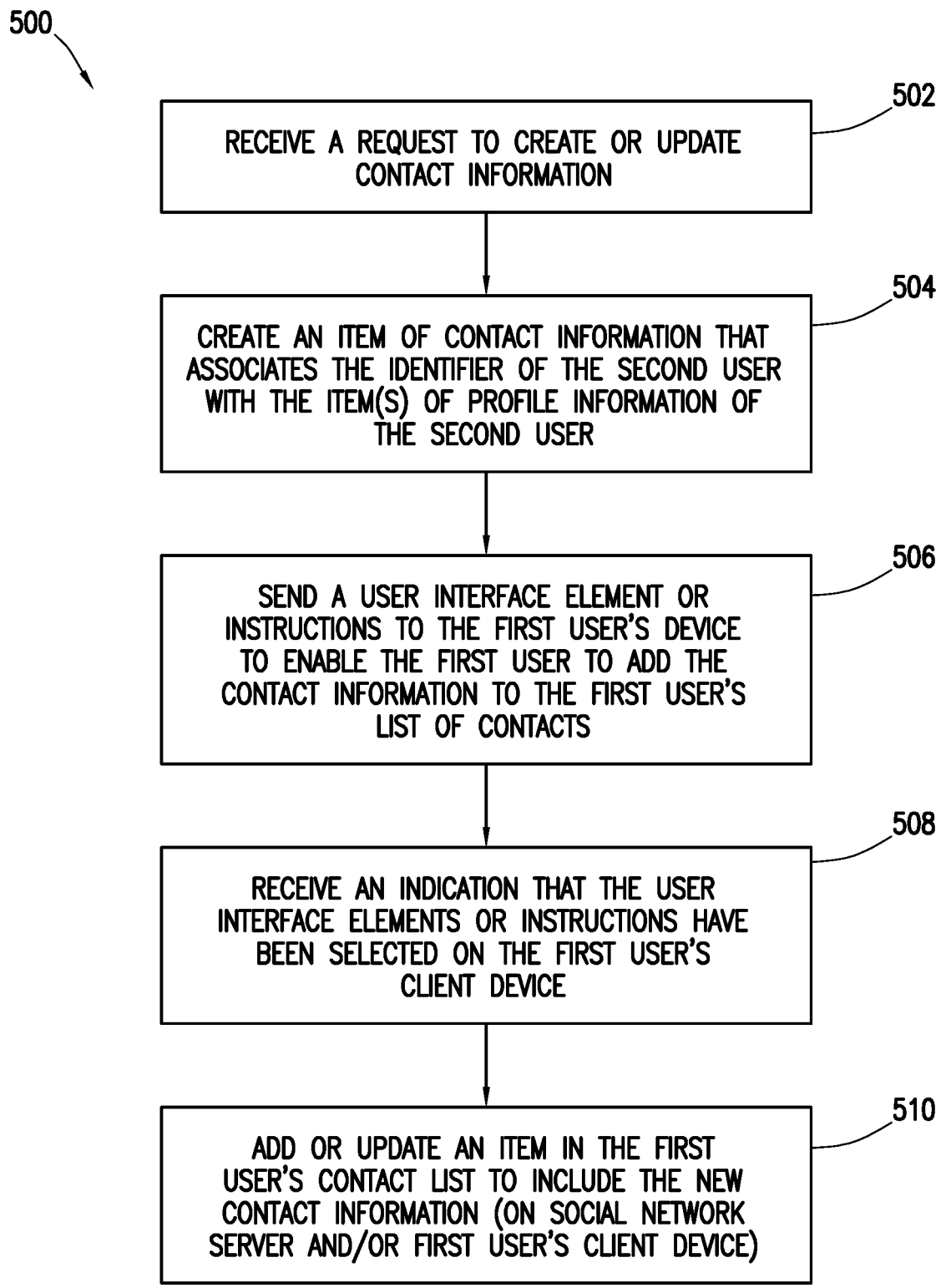
FIG. 5 illustrates an example method of creating or updating contact information.

FIG. 5 illustrates an example method 500 of creating or updating contact information. The method may begin at step 502, where the social-networking system 160 may receive a request to create or update contact information. At step 504, the social-networking system 160 may create a new item of contact information that associates a specified identifier of the second user with one or more corresponding items of profile information of the second user. At step 506, the social-networking system 160 may send a user-interface element or instructions for generating a user-interface element to the first user's client system 130A to enable the first user to add the contact information to his or her list of contacts. At step 508, the social-networking system 160 may receive an indication that the user interface element of instructions have been selected on the first user's client system 130A. At step 510, the social-networking system 160 may add or update an item in the first user's contact list to include the new contact information.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for creating or updating contact information including the particular steps of the method of FIG. 5, this disclosure contemplates any suitable method for creating or updating contact information including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
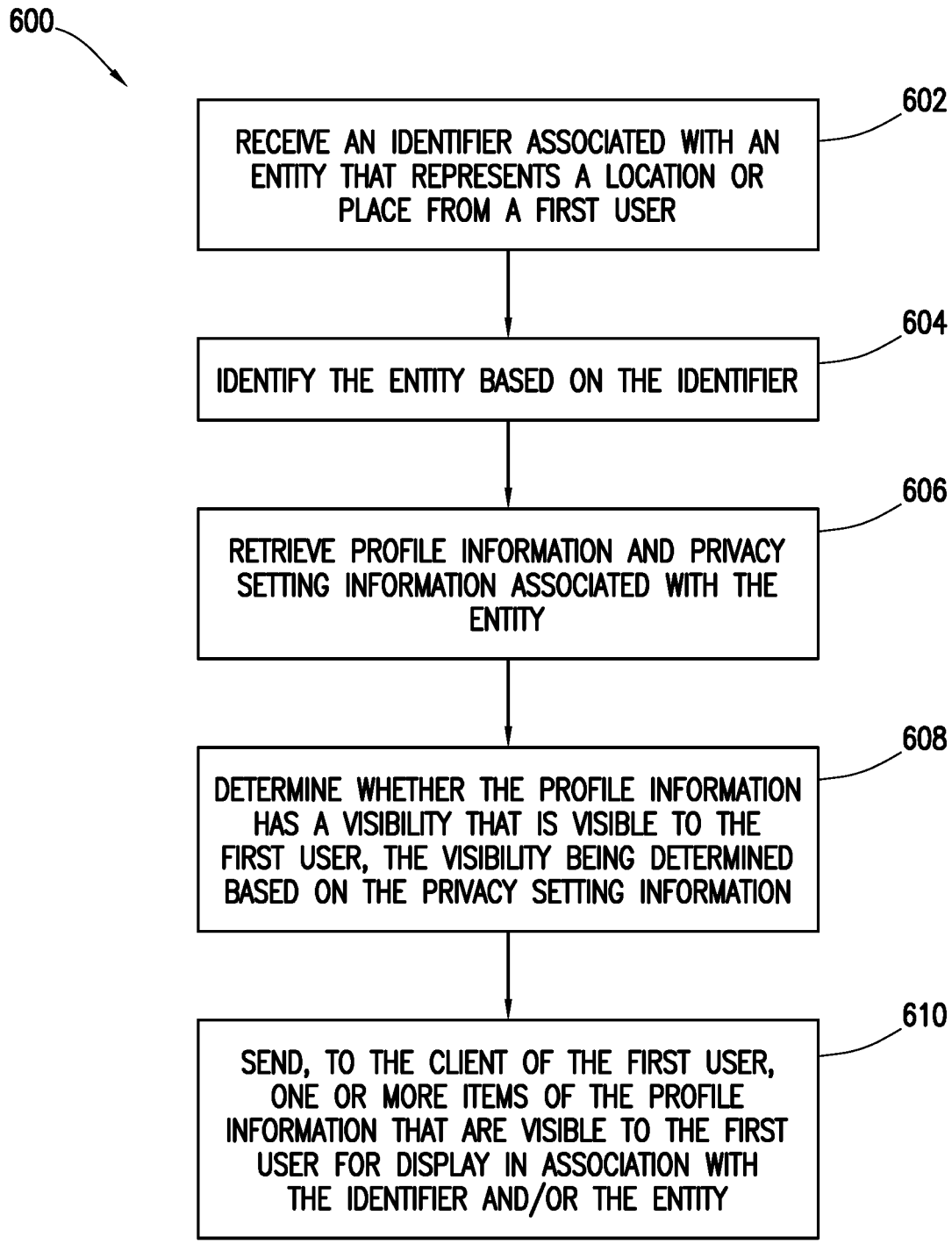
FIG. 6 illustrates an example method of accessing social network entity profile information.

FIG. 6 illustrates an example method 600 for accessing social network entity profile information. The method may begin at step 602, where the social-networking system 160 may receive, from a first user, an identifier, such as a phone number or name, associated with an entity that represents a location or place. At step 604, the social-networking system 160 may identify the location or place based on the identifier. At step 606, the social-networking system 160 may retrieve profile information and/or privacy setting information associated with the location or place. At step 608, the social-networking system 160 may determine whether the profile information has a visibility that is visible to the first user. The visibility may be determined based on the privacy setting information. At step 610, the social-networking system 160 may send, to the client system 130A of the first user, one or more items of the profile information that are visible to the first user for display in association with the identifier and/or the place or location.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for accessing social network entity profile information including the particular steps of the method of FIG. 6, this disclosure contemplates any suitable method for accessing social network entity profile information, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
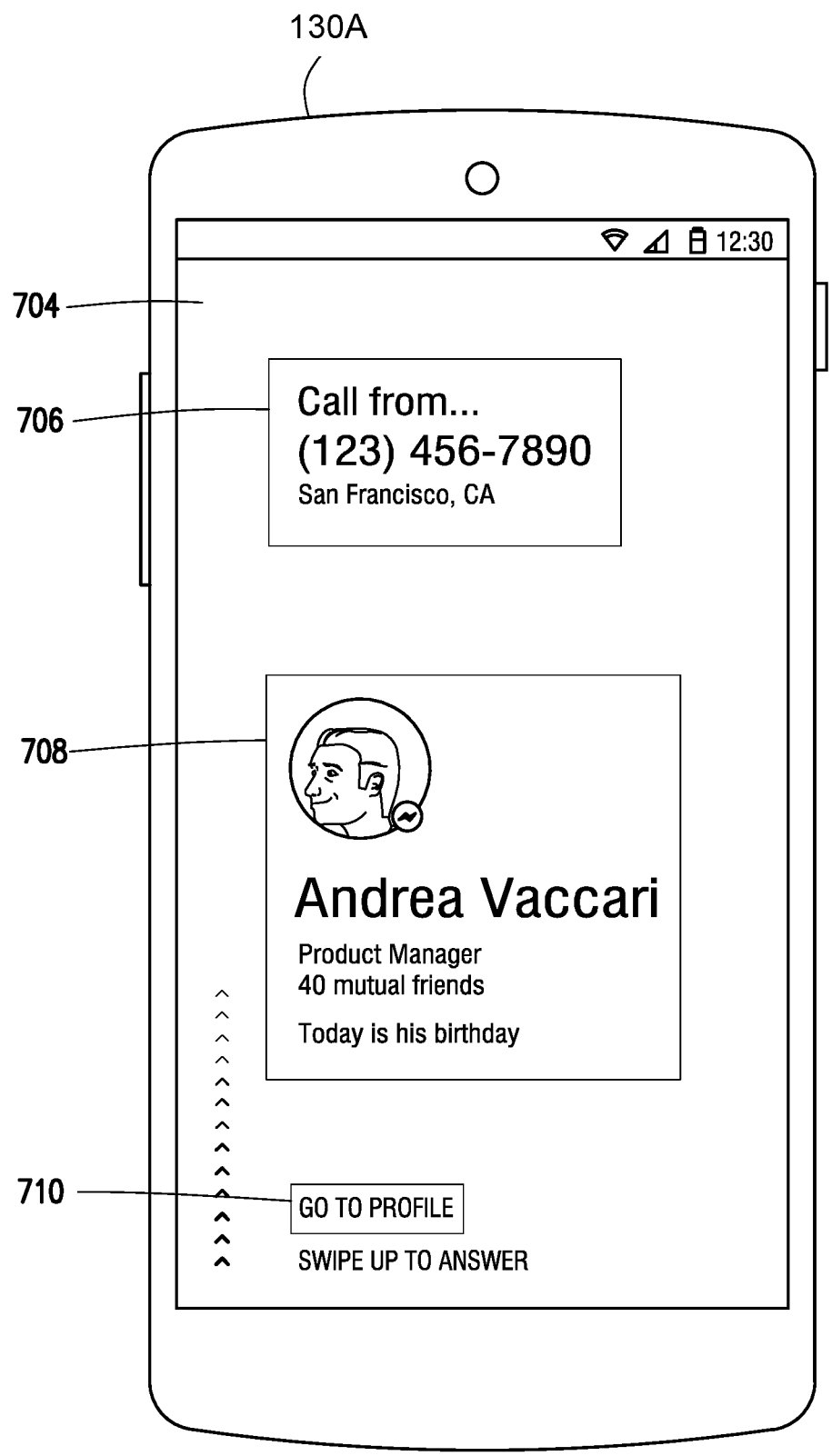
FIG. 7 illustrates an example incoming call user interface for receiving calls.

FIG. 7 illustrates an example incoming call user interface 704 for receiving calls. A social-phone application may display the incoming call user interface 704 on a first user's client system 130A when a second user calls the first user's client system 702. A phone number associated with the incoming call, (123) 466-7890, and a location associated with the phone number (San Francisco, Calif.) may be displayed in an incoming caller identification area 706 of the user interface 704. Profile information associated with the second (calling) user, such as a photo, name, title, number of mutual friends, and birthday notice of the second user may be displayed in a caller profile area 708. The profile information may be determined based on the phone number of the incoming call as described with reference to FIGS. 3A, 4A, and 4B. The first user may interact with the user interface 704 to answer the call, e.g., by swiping a thumb or finger in an upward direction on the screen. As an example and not by way of limitation, the social-phone application may provide a Go to Profile link or button 710 that a first user can press or select to view a second user's profile, e.g., user profile page. When the first user presses or selects the Go to Profile link or button 710, each item of the profile information associated with the second user may be displayed on the first user's client system 130A (e.g., mobile phone), subject to privacy controls. Although this disclosure describes linking to a user's profile in a particular manner, this disclosure contemplates linking to a user's profile in any suitable manner.

Figure 8:
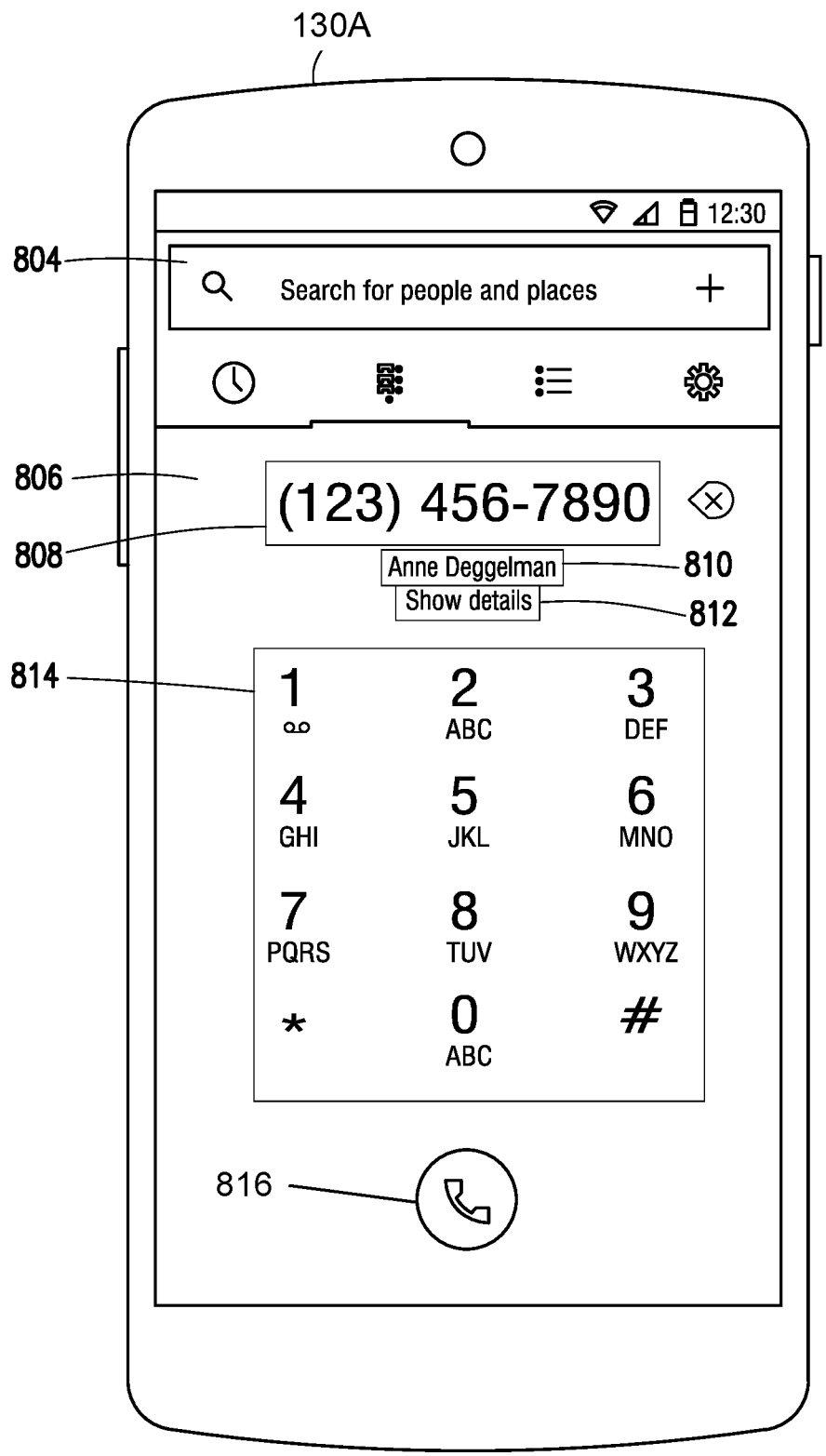
FIG. 8 illustrates an example dialer user interface for placing outgoing calls.

FIG. 8 illustrates an example dialer user interface 806 for placing outgoing calls. A social-phone application may display the dialer user interface 806 on a first user's client system 130A. The dialer user interface 806 may be associated with a search field 804, which may receive a search string that specifies at least a portion of a name or phone number of a user. When the user inputs a search string in the search field 804, one or more users, locations, and/or places (e.g., businesses) having names or phone numbers that match the search string may be identified and displayed. The phone number 808 and name 810 of one of the matches (e.g., the best match), or of a match selected by the user, may be displayed in the dialer user interface 806. Alternatively, the user may input a phone number using a keypad 814 (e.g., a keypad image displayed on a touch screen). When the user inputs the phone number, the social-phone application may request user profile information for the phone number from the online social network as described with reference to FIGS. 3B, 4A, and 4C. The phone number received from the user may be displayed as the phone number 808, and the user profile information, such as the name associated with the phone number 808, may be displayed in the name area 810. A "Show details" option 812 may be selected by the user to display additional items of the user profile information, such as a street address, city, or other information associated with the phone number 808. The user may initiate a call to the phone number 808 by pressing or selecting a dial icon 816.

Figure 9:
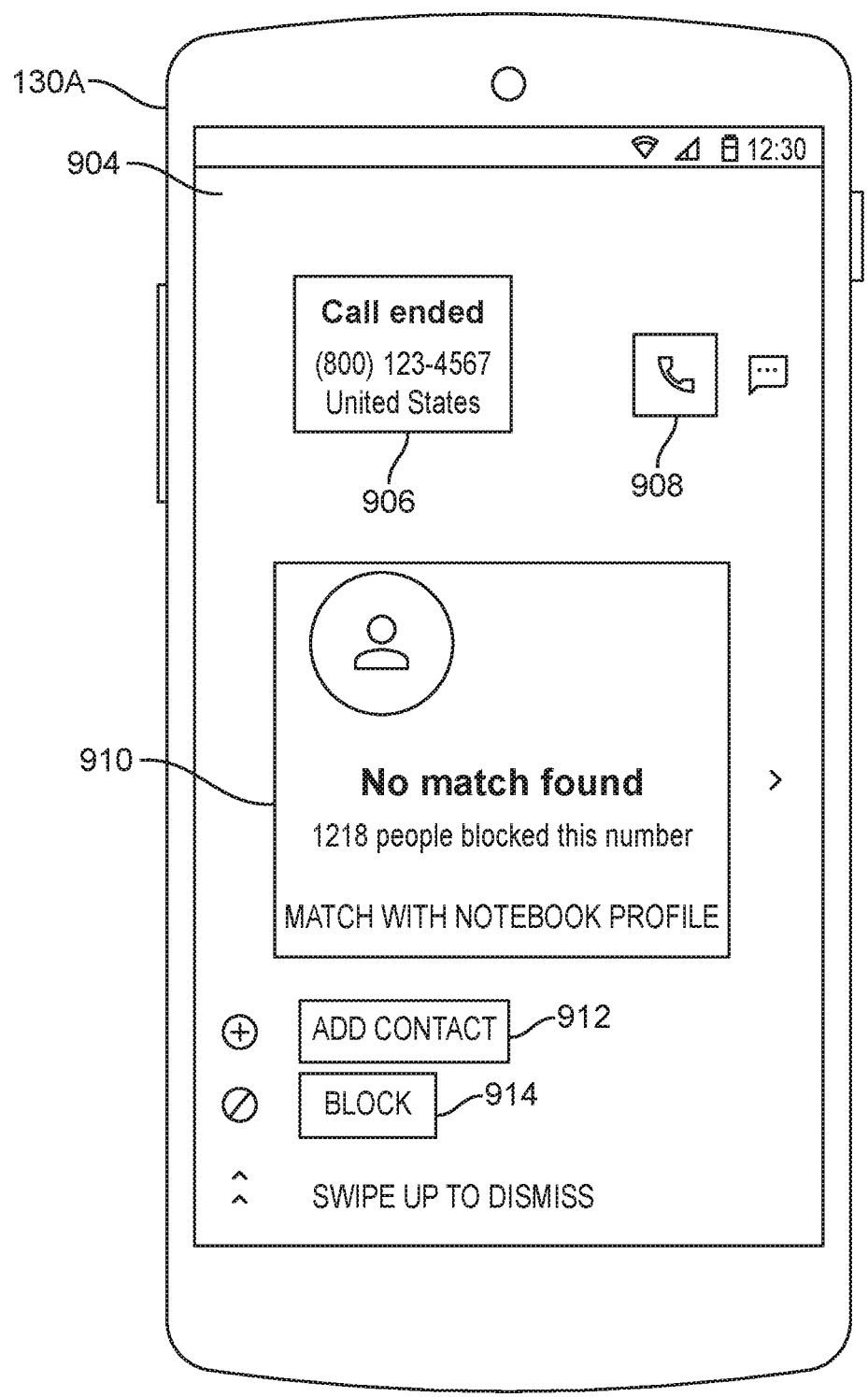
FIG. 9 illustrates an example caller blocking user interface for blocking unwanted callers.

FIG. 9 illustrates an example caller blocked user interface 904 for blocking unwanted callers in a social-phone application. The social-phone application may display the caller blocked user interface 904 on a first user's client system 130A when an incoming call is blocked, e.g., because the caller's phone number is on a list of blocked numbers maintained by the online social network, or is on a list of numbers that the user has explicitly blocked. In particular embodiments, the social-phone application may provide spam filtering by automatically blocking calls from particular users or phone numbers. The online social network can track which users or numbers have been blocked by other users. A list of blocked numbers may be maintained by social-networking system 160, and each user or number in the list may be associated with the number of people who have blocked that user or number. If a user or number has been explicitly blocked by more than a threshold number of users, then the online social network may block that number for other users who have not explicitly blocked the number. The social-phone application may provide the blocking feature by querying social-networking system 160 to determine whether the phone number associated with each incoming call is on the list of blocked numbers. If so, the social-phone application may block the incoming call by, for example, automatically declining the call with or without providing a notification that the number has been blocked to the user of the client system 130. Although this disclosure describes automatically blocking calls in a particular manner, this disclosure contemplates automatically blocking calls in any suitable manner.

In particular embodiments, the user interface 904 may display the text "Call ended" near the blocked phone number 906 and a location associated with the blocked phone number 906. The user may initiate a call to the blocked phone number 906 by pressing or selecting a dial icon 908. The phone application may also display profile information associated with the blocked phone number 906, if the profile information can be found (e.g., as described with reference to FIGS. 3B, 4A, and 4C). In the example of FIG. 9, the profile information is unknown, so a message 910 that includes the text "No match found" is displayed. The message 910 also includes an indication of the number of other people who have blocked the number, e.g., "1218 people blocked this number." As described above, if at least a threshold number of users block a number, then the number may be blocked automatically for other users. The number 906 in FIG. 9 was therefore not necessarily blocked by the user of the phone application, but may have been blocked automatically because of the number of other users who blocked the number. The user interface 904 also includes an "add contact" button 912, which the user may press or select to cause a contact to be created for the number 906. The user may also press or select a "block" button 914 to block subsequent calls from the number 906 regardless of how many other people have blocked the number 906.

Figure 10:
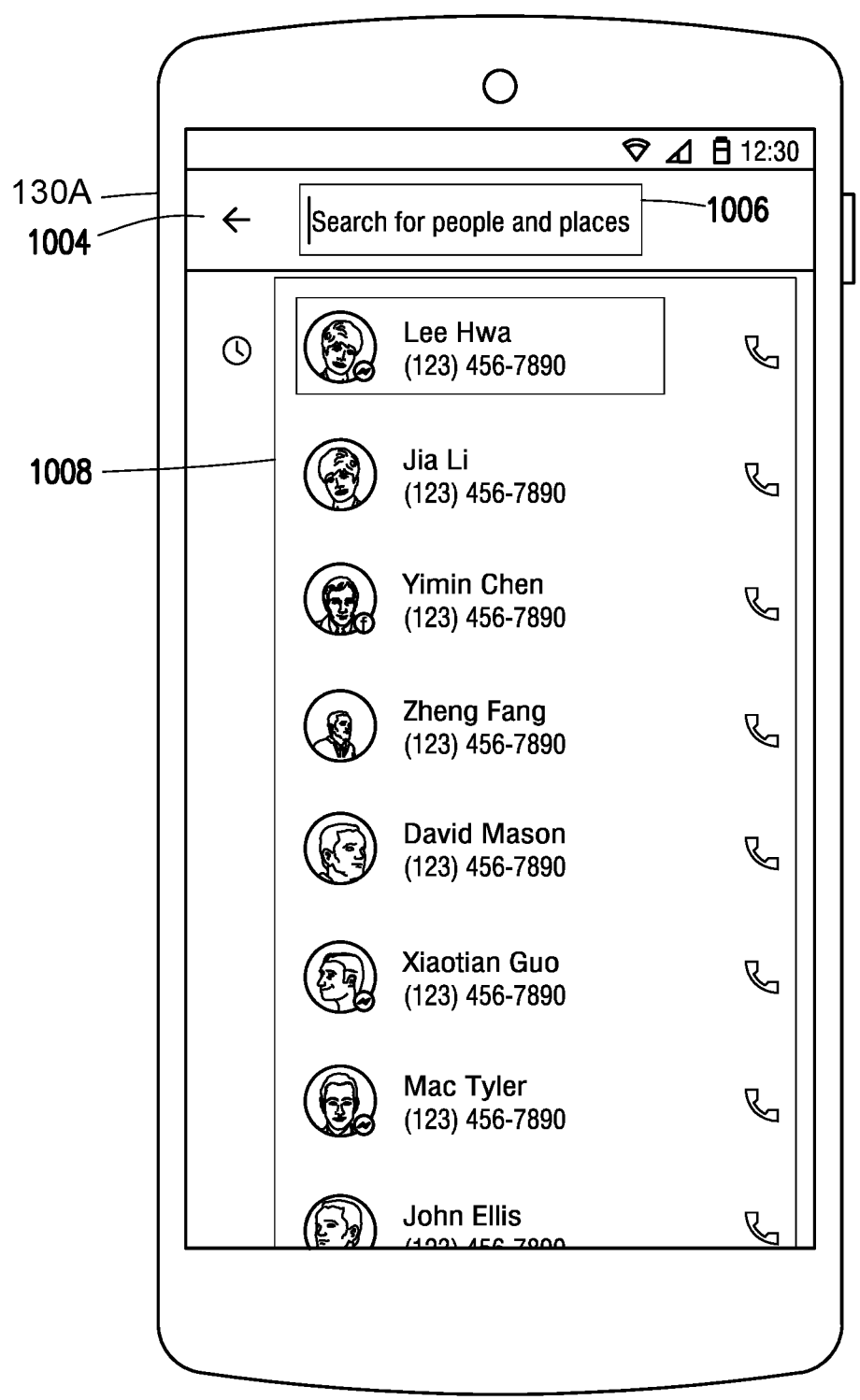
FIG. 10 illustrates an example user search interface.

FIG. 10 illustrates an example user search interface 1004 in a social-phone application. The search interface 1004 may be displayed on a first user's client system 130A. In particular embodiments, the social-phone application may provide search features. As an example and not by way of limitation, the first user may enter a search query string in a search input field of the social-phone application. The social-phone application may then search the local contacts list on the user's client system 130A (stored either in the social-phone application or the phone's native dialing application/address book). If the first user searches for the name of a second user who is not in the first user's local contacts, the social-phone application may then automatically search the online social network for the name of the second user. If a match is found, a contact may be created in the first user's contact list, and the information in the second user's profile, such a phone number, email address, messenger information, and the like may be stored in the contact list. Searching for users and the resulting lists of users are discussed in further detail in U.S. patent application Ser. No. 14/231,049, filed 31 Mar. 2014, U.S. patent application Ser. No. 14/231, 201, filed 31 Mar. 2014, and U.S. patent application Ser. No. 14/323,975, filed 3 Jul. 2014, which are incorporated by reference.

In particular embodiments, the search feature may be used to search for places or locations. As an example and not by way of limitation, the name of a restaurant may be entered in the search input field of the social-phone application. If the restaurant is not in the local contacts list on the user's phone, then the social-phone application may search the online social network for an entity associated with the online social network with a name matching the name inputted in the search field. If the restaurant is found, the restaurant's profile information may be displayed on the user's mobile device. The social-phone application may also provide a save feature that the first user may use to save the information retrieved for the entity (e.g., via a Save Location button, which the first user can select to save the retrieved location's information). Information such as hours of operation, profile-page, business address, and directions may also be displayed in the social-phone application.

In particular embodiments, the social-phone application may provide a social-network user search feature to enable a user to search the online social network for users who match given contact information. If the user knows an item of contact information for a person, e.g., the person's name, then the user may enter the information as a search query in the social-phone application, and the application may find the user profiles of users who match the query. Each matching user profile may be displayed with an associated View Profile button and an associated Link button. The user may select the View Profile button to view the profile information of the matching user. The user may select the Link button to create a link between the user profile and the contact entry in the social-phone application. That is, the Link feature can manually associate a contact entry to a particular user profile on the online social network. A photo of the person associated with the contact entry, as well as profile information such as the person's birthday, time zone, and so on, may be displayed by the social-phone application. The process of matching the contact information to the profile may include saving the information to a database of crowd-sourced information. If a sufficient number of users link a contact having partial information to a profile, then that contact may be automatically linked to that profile by the social-networking system 160 for other users. Although this disclosure describes searching a social network for user information in a particular manner, this disclosure contemplates searching a social network for user information in any suitable manner.

Referring to FIG. 10, the social-phone application may display a user search interface 1004 on a first user's client system 130A when the user selects a search option of the application. The user may input a search string, such as a portion of a name of a person or place, in an input field 1006. The social-phone application may send a search request to the social-network requesting the names and phone numbers of users who match the search string. The names and phone numbers may then be received from the online social network and displayed in a results area 1008 of the user interface 1004. The user may touch or select a dial icon associated with one of the search results 1008 to call the phone number associated with the search result 1008.

Figure 11:
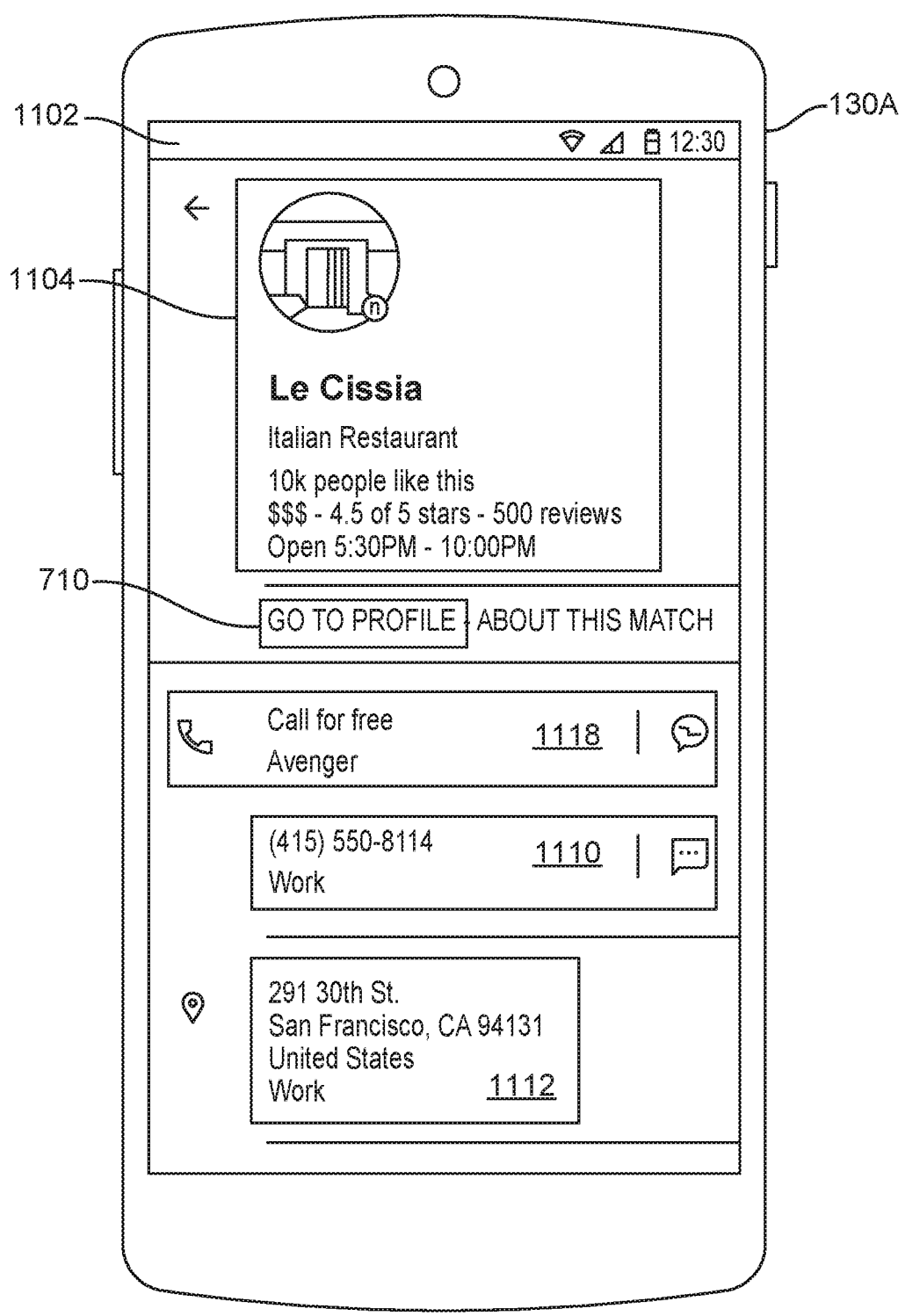
FIG. 11 illustrates an example business search interface.

FIG. 11 illustrates an example business information user interface 1100 in a social-phone application. The social-network application may retrieve profile information about a business, and display the profile information in a user interface 1102 of a first user's client system 130A. The profile information may be retrieved when a user searches for a place or location (e.g., business) name using the search user interface 1004 of FIG. 10 or the like, and one of the identified places or locations is selected by the user. The displayed business information may include profile information 1104, such as a photo and name or address of the business. A "go to profile" button 710 causes display of profile details, e.g., a profile web page, of the business identified by profile information 1104. A "call for free" interface 1118 may initiate a free phone call to the displayed business when the user touches or selects a dial icon of the interface 1108. A phone number 1110 associated with the business may be displayed along with profile information of the business, such as an address 1112 of the business.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by the social-networking system 160 or shared with other systems (e.g., a third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 12:
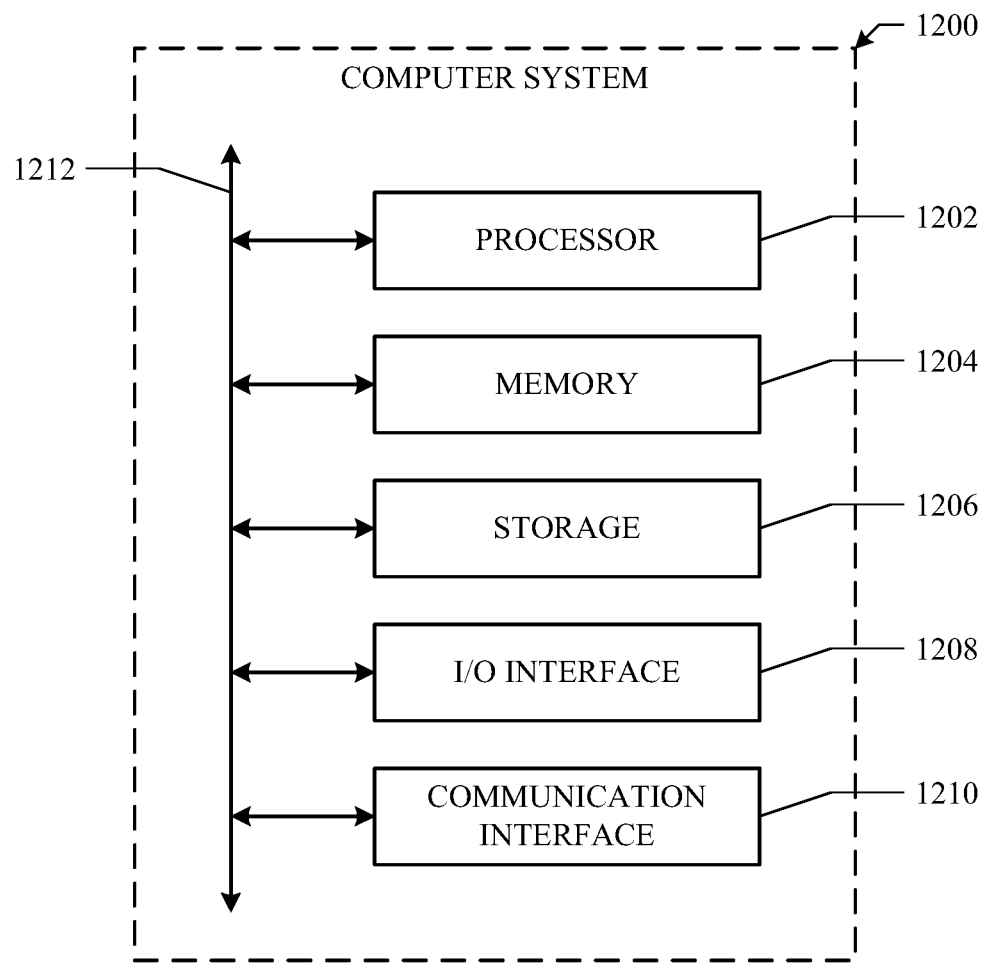
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system of an online social network:
   receiving, from a mobile client system of a first user of the online social network, at a computing system of the online social network, a unique identifier associated with a second user of the online social network, the unique identifier being sent responsive to a request to communicate with the first user from the second user, wherein the second user is associated with a profile that comprises one or more items of profile information that are not initially visible to the first user;
   identifying, by the computing system, the second user based on the unique identifier;
   retrieving, by the computing system responsive to receiving the unique identifier, the one or more items of profile information associated with the second user that are not initially visible to the first user;
   accessing, by the computing system, a list of blocked identifiers;
   determining, by the computing system, whether the unique identifier associated with the second user matches one of the blocked identifiers; and
   sending, from the computing system to the mobile client system of the first user, responsive to determining that the unique identifier associated with the second user matches one of the blocked identifiers, a notification that a communication request from the second user has been declined, wherein the notification comprises the one or more items of profile information associated with the second user for display and a link operable for the first user to access the profile associated with the second user.

2. The method of claim 1, further comprising:
   sending, from the computing system to the mobile client system of the first user, responsive to determining that the unique identifier associated with the second user matches one of the blocked identifiers, an indication of a number of other users on the online social network who have blocked the second user.

3. The method of claim 1, further comprising:
   sending, from the computing system to the mobile client system of the first user, responsive to determining that the unique identifier associated with the second user matches one of the blocked identifiers, a location associated with the second user.

4. The method of claim 1, further comprising:
   sending, from the computing system to the mobile client system of the first user, responsive to determining that the unique identifier associated with the second user matches one of the blocked identifiers, instructions for presenting one or more user interface elements for display, wherein the one or more user interface elements are operable for the first user to perform one or more actions.

5. The method of claim 4, wherein the one or more actions comprise confirming that the second user should be blocked.

6. The method of claim 4, wherein the one or more actions comprise initiating a communication to the second user.

7. The method of claim 4, wherein the one or more actions comprise adding contact information of the second user to a list of contacts on the mobile client system of the first user.

8. The method of claim 7, wherein the contact information comprises the unique identifier and the one or more items of profile information associated with the second user having a visibility that are not initially visible to the first user.

9. The method of claim 7, further comprising updating the list of contacts to include the contact information of the second user.

10. The method of claim 1, wherein the unique identifier comprises one or more of:
    a phone number;
    an email address;
    an ID associated with a social-networking application;
    an ID associated with an online social network; or
    a VOIP ID.

11. The method of claim 1, wherein the request to communicate with the first user from the second user comprises a request of communication by a telephone call, and wherein the unique identifier comprises a telephone number of the second user.

12. The method of claim 1, wherein the unique identifier comprises at least a portion of the second user's name, and wherein identifying the second user based on the unique identifier comprises identifying the second node corresponding to the second user, wherein a user name associated with the second node matches the at least a portion of the second user's name.

13. The method of claim 1, wherein the unique identifier comprises at least a portion of the second user's name, and identifying the second user based on the unique identifier comprises identifying a plurality of nodes corresponding to a plurality of users having names matching the portion of the second user's name, and identifying the second node corresponding to the second user comprises selecting one of the plurality of nodes for which the associated user name most closely matches the at least a portion of the second user's name.

14. The method of claim 1, wherein the unique identifier comprises at least a portion of the second user's name, and sending, from the computing system to the mobile client system of the first user, responsive to determining that the unique identifier associated with the second user matches one of the blocked identifiers, the one or more items of profile information associated with the second user for display comprises:
- identifying one or more second nodes corresponding to the second user, wherein a user name associated with each of the one or more second nodes matches the at least a portion of the second user's name;
- identifying one or more second users based on the one or more second nodes;
- retrieving one or more items of profile information associated with each of the one or more second users and a privacy setting associated with each of the one or more second users;
- determining whether the one or more items of profile information associated with each of the one or more second users has a visibility that is visible to the first user, the visibility of each of the one or more items of profile information being determined based on the privacy setting associated with the second user and one or more degrees of separation in the social graph between the first node corresponding to the first user and one or more second nodes corresponding to the one or more second users; and
- sending, to the client system of the first user, one or more of the items of profile information associated with the one or more second users having a visibility that is visible to the first user for display in association with the communication between the one or more second users and the first user.

15. The method of claim 14, wherein the one or more items of profile information and the privacy setting associated with the second user are associated with the second node.

16. The method of claim 1, wherein the first node corresponding to the first user and second node corresponding to the second user are not connected by an edge in the social graph.

17. The method of claim 1, wherein identifying the second user based on the unique identifier comprises identifying a user node associated with a communication address that corresponds to the unique identifier, and the second node is the identified user node.

18. The method of claim 1, wherein the one or more items of profile information associated with the second user comprise a name of the second user.

19. One or more computer-readable non-transitory storage media embodying software that is operable when executed to:
- receive, from a mobile client system of a first user of the online social network, at a computing system of the online social network, a unique identifier associated with a second user of the online social network, the unique identifier being sent responsive to a request to communicate with the first user from the second user, wherein the second user is associated with a profile that comprises one or more items of profile information that are not initially visible to the first user;
- identify, by the computing system, the second user based on the unique identifier;
- retrieve, by the computing system responsive to receiving the unique identifier, the one or more items of profile information associated with the second user that are not initially visible to the first user;
- access, by the computing system, a list of blocked identifiers;
- determine, by the computing system, whether the unique identifier associated with the second user matches one of the blocked identifiers; and
- send, from the computing system to the mobile client system of the first user, responsive to determining that the unique identifier associated with the second user matches one of the blocked identifiers, a notification that a communication request from the second user has been declined, wherein the notification comprises the one or more items of profile information associated with the second user for display and a link operable for the first user to access the profile associated with the second user.

20. A computing system of an online social network comprising: one or more processors; and a non-transitory memory coupled to the processors comprising instructions executable by the processors, the processors operable when executing the instructions to:
- receive, from a mobile client system of a first user of the online social network, at a computing system of the online social network, a unique identifier associated with a second user of the online social network, the unique identifier being sent responsive to a request to communicate with the first user from the second user, wherein the second user is associated with a profile that comprises one or more items of profile information that are not initially visible to the first user;
- identify, by the computing system, the second user based on the unique identifier;
- retrieve, by the computing system responsive to receiving the unique identifier, the one or more items of profile information associated with the second user that are not initially visible to the first user;
- access, by the computing system, a list of blocked identifiers;
- determine, by the computing system, whether the unique identifier associated with the second user matches one of the blocked identifiers; and
- send, from the computing system to the mobile client system of the first user, responsive to determining that the unique identifier associated with the second user matches one of the blocked identifiers, a notification that a communication request from the second user has been declined, wherein the notification comprises the one or more items of profile information associated with the second user for display and a link operable for the first user to access the profile associated with the second user.

\* \* \* \* \*